(12) United States Patent
Nakamura et al.

(10) Patent No.: US 10,437,052 B2
(45) Date of Patent: Oct. 8, 2019

(54) IMAGE DISPLAY DEVICE AND OBJECT APPARATUS

(71) Applicant: Ricoh Company, Ltd., Ohta-ku, Tokyo (JP)

(72) Inventors: Kento Nakamura, Kanagawa (JP); Daisuke Ichii, Kanagawa (JP); Makoto Inamoto, Kanagawa (JP); Hiroyuki Tanabe, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 236 days.

(21) Appl. No.: 15/138,478

(22) Filed: Apr. 26, 2016

(65) Prior Publication Data
US 2016/0320615 A1    Nov. 3, 2016

(30) Foreign Application Priority Data

Apr. 28, 2015    (JP) .................................. 2015-090944

(51) Int. Cl.
*G02B 27/01* (2006.01)
*G02B 3/00* (2006.01)
(Continued)

(52) U.S. Cl.
CPC ....... *G02B 27/0101* (2013.01); *G02B 3/0043* (2013.01); *G02B 3/0056* (2013.01); *G02B 5/0257* (2013.01); *G02B 27/0961* (2013.01); *G02B 27/48* (2013.01); *G02B 2027/011* (2013.01); *G02B 2027/0112* (2013.01); *G02B 2027/0141* (2013.01)

(58) Field of Classification Search
None
See application file for complete search history.

(56) References Cited

U.S. PATENT DOCUMENTS 5,052,783 A    10/1991    Hamada
5,465,265 A    11/1995    Ota
(Continued)

FOREIGN PATENT DOCUMENTS

CN          1906547 A      1/2007
CN        104350398 A      2/2015
(Continued)

OTHER PUBLICATIONS

Extended European Search Report dated Sep. 12, 2016 in European Patent Application No. 16167147.4.
(Continued)

*Primary Examiner* — William R Alexander
*Assistant Examiner* — Gary W O'Neill
(74) *Attorney, Agent, or Firm* — Xsensus LLP

(57) ABSTRACT

An image display device includes a light source to emit light, an image forming element to form an image with the light emitted from the light source, a micro-lens array to be irradiated with the light forming the image, the micro-lens array including a plurality of lens columns arranged in a second direction, each lens column including micro-lenses being arranged in a first direction, the first direction and the second direction being perpendicular with each other, and a projection optical system to project light passing through the micro-lens array toward a transmitting and reflecting member.

14 Claims, 19 Drawing Sheets

(51) Int. Cl.
*G02B 5/02* (2006.01)
*G02B 27/09* (2006.01)
*G02B 27/48* (2006.01)

(56) References Cited

U.S. PATENT DOCUMENTS

| | | | |
|---|---|---|---|
| 6,469,830 B1 | 10/2002 | Dubin et al. | |
| 8,662,665 B2* | 3/2014 | Iyer | G02C 7/06 |
| | | | 351/159.42 |
| RE45,945 E | 3/2016 | Hayashi et al. | |
| 9,411,172 B2* | 8/2016 | Haddock | G02B 5/1895 |
| 2003/0002871 A1 | 1/2003 | Ohmura | |
| 2003/0107802 A1 | 6/2003 | Dubin et al. | |
| 2008/0253608 A1 | 10/2008 | Long et al. | |
| 2010/0284045 A1 | 11/2010 | Kawano et al. | |
| 2012/0142436 A1 | 6/2012 | Sato | |
| 2013/0050655 A1* | 2/2013 | Fujikawa | G02B 27/0101 |
| | | | 353/38 |
| 2013/0127973 A1 | 5/2013 | Ichii | |
| 2013/0286150 A1 | 10/2013 | Sato et al. | |
| 2014/0055864 A1 | 2/2014 | Nomoto et al. | |
| 2014/0133002 A1 | 5/2014 | Tatsuno et al. | |
| 2014/0160573 A1* | 6/2014 | Teramura | G02B 3/0056 |
| | | | 359/619 |
| 2014/0177022 A1 | 6/2014 | Saisho et al. | |
| 2015/0055204 A1 | 2/2015 | Ichii | |
| 2015/0103410 A1* | 4/2015 | Ando | G02B 27/0101 |
| | | | 359/630 |
| 2015/0219803 A1 | 8/2015 | Inamoto et al. | |
| 2015/0277115 A1 | 10/2015 | Inamoto et al. | |
| 2015/0278572 A1 | 10/2015 | Asukai et al. | |
| 2015/0370069 A1 | 12/2015 | Saisho et al. | |
| 2016/0073021 A1 | 3/2016 | Chang et al. | |

FOREIGN PATENT DOCUMENTS

| | | |
|---|---|---|
| EP | 0 366 462 A2 | 5/1990 |
| EP | 2 746 825 A1 | 6/2014 |
| EP | 2 993 894 A1 | 3/2016 |
| JP | 2003-004907 A | 1/2003 |
| JP | 2012-208440 | 10/2012 |
| JP | 2013-064985 A | 4/2013 |
| JP | 2014-016414 | 1/2014 |
| JP | 2014-139655 | 7/2014 |
| JP | 2014-139656 | 7/2014 |
| JP | 2014-139657 | 7/2014 |
| JP | 2015-022158 | 2/2015 |
| JP | 2015-041039 | 3/2015 |
| JP | 2015-108838 | 6/2015 |
| JP | 2015-145962 | 8/2015 |
| JP | 2015-148664 | 8/2015 |
| JP | 2015-169781 | 9/2015 |
| JP | 2015-169804 | 9/2015 |
| JP | 2015-232691 | 12/2015 |
| JP | 2015-232692 | 12/2015 |
| JP | 2015-232693 | 12/2015 |
| WO | WO 2008/112216 A1 | 9/2008 |
| WO | WO 2014/091659 A1 | 6/2014 |
| WO | WO 2014/203652 A1 | 12/2014 |

OTHER PUBLICATIONS

Extended European search Report dated Sep. 12, 2016 in Patent Application No. 16167147.4.
Andrew Richardson, et al., "AprilCal: Assisted and repeatable camera calibration," IEEE/RSJ International Conference on Intelligent Robots and Systems, XP032537280, Nov. 3, 2013, 8 pages.
U.S. Appl. No. 14/885,246, filed Oct. 16, 2015.
Combined Office Action and Search Report dated Jul. 25, 2017 in Chinese Patent Application No. 201610265311.X (with English translation of categories of cited documents).
Combined Chinese Office Action and Search Report dated Oct. 8, 2018 in Patent Application No. 201610265311.X (with English language translation of categories of cited documents).
Japanese Office Action dated Jan. 15, 2019 for Japanese Patent Application No. 2015-090944.

* cited by examiner

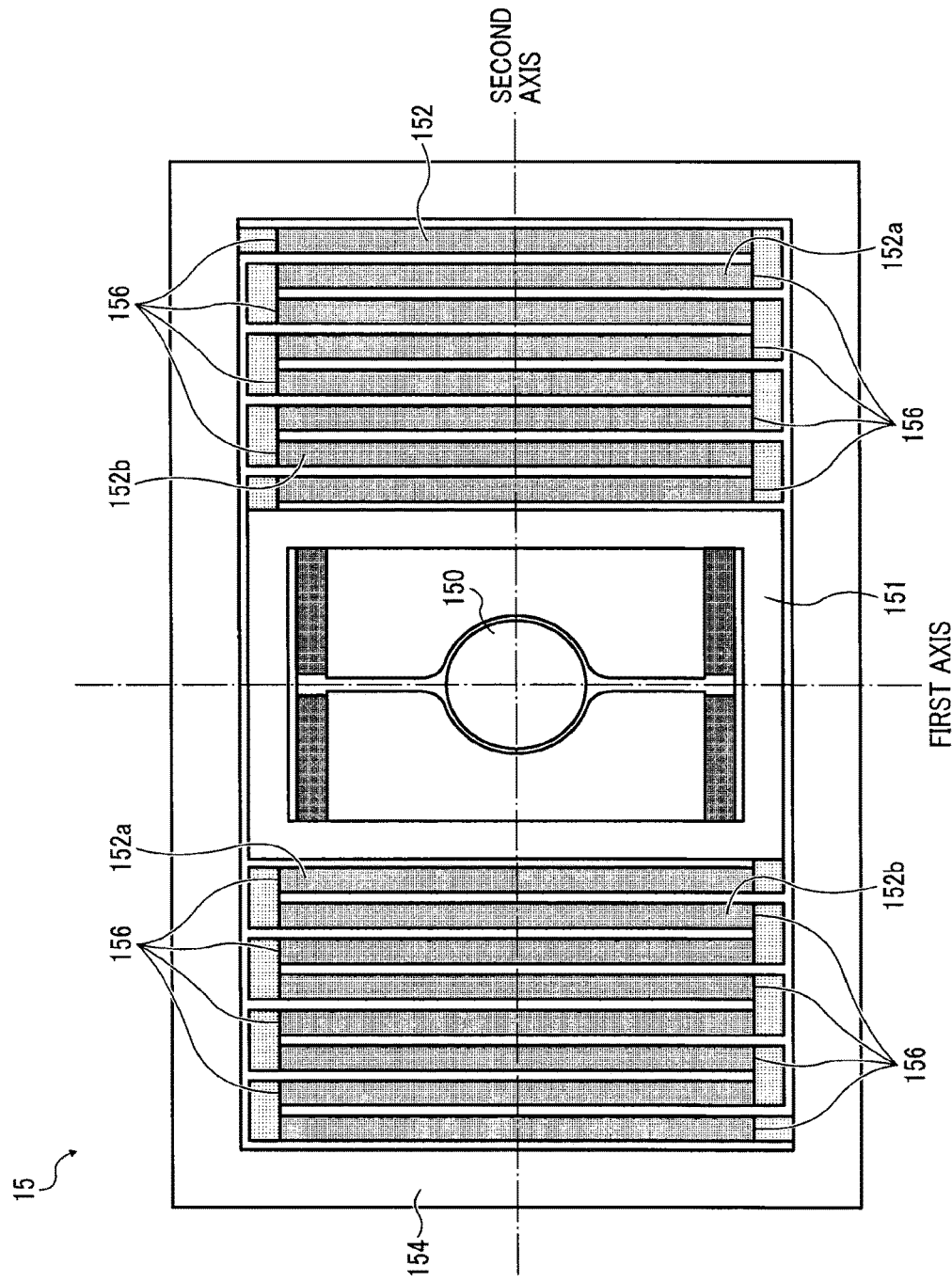

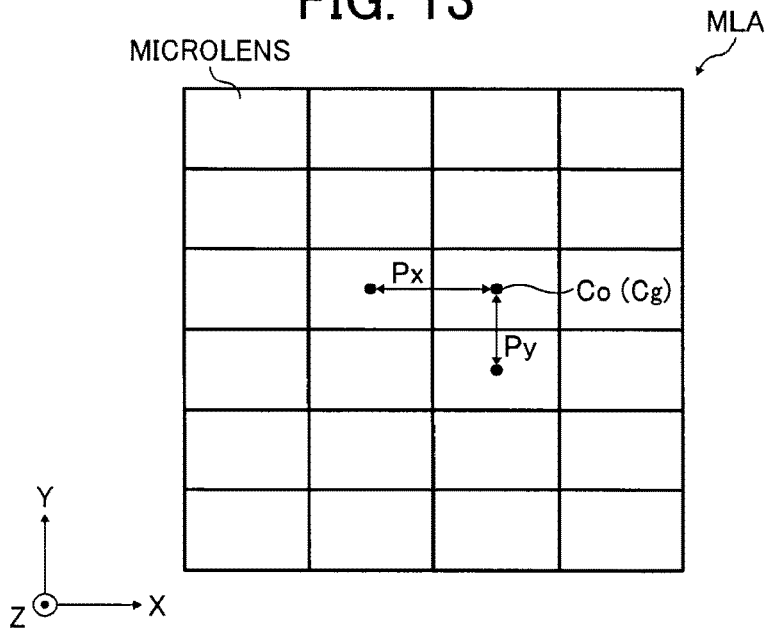
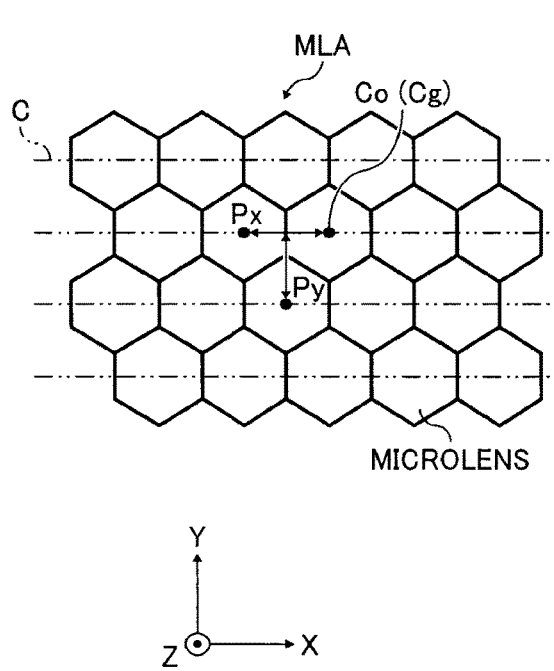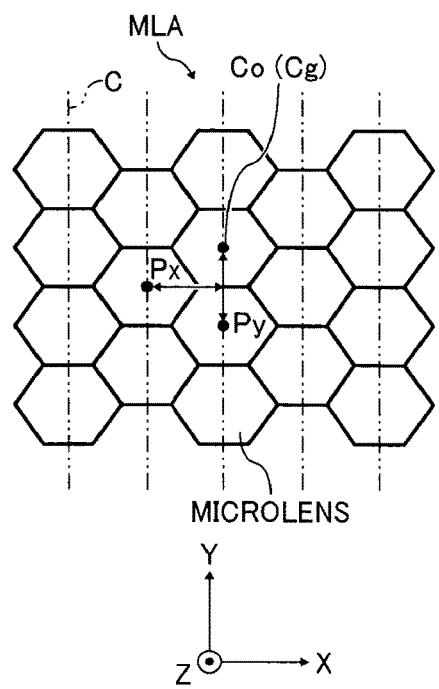

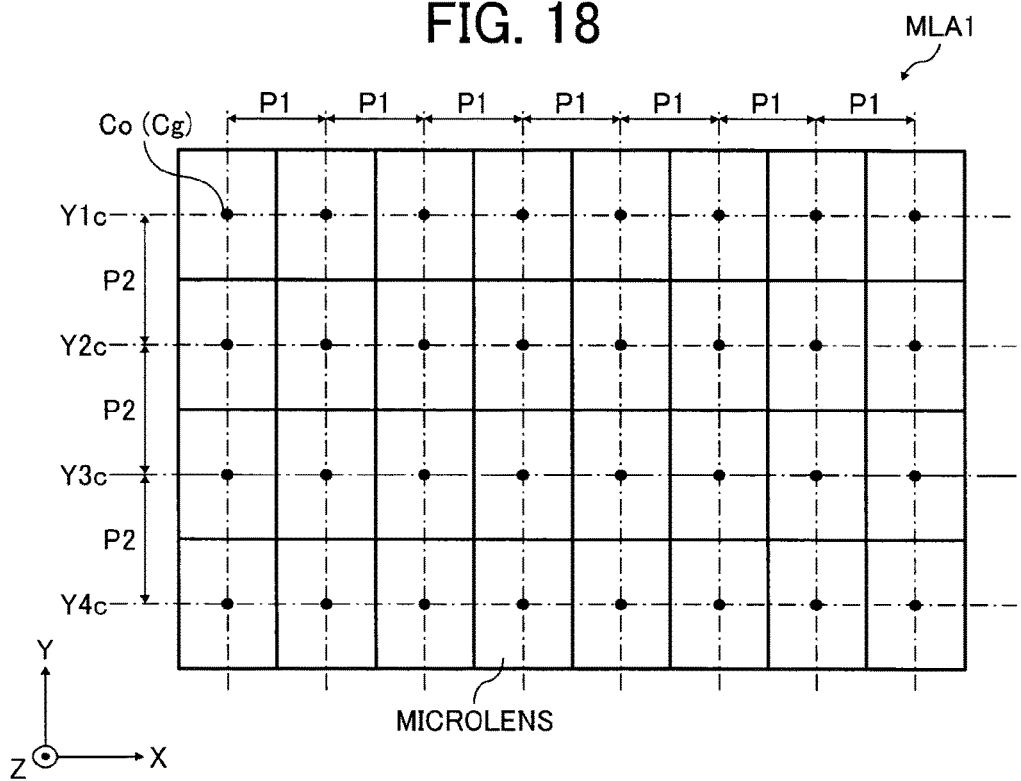
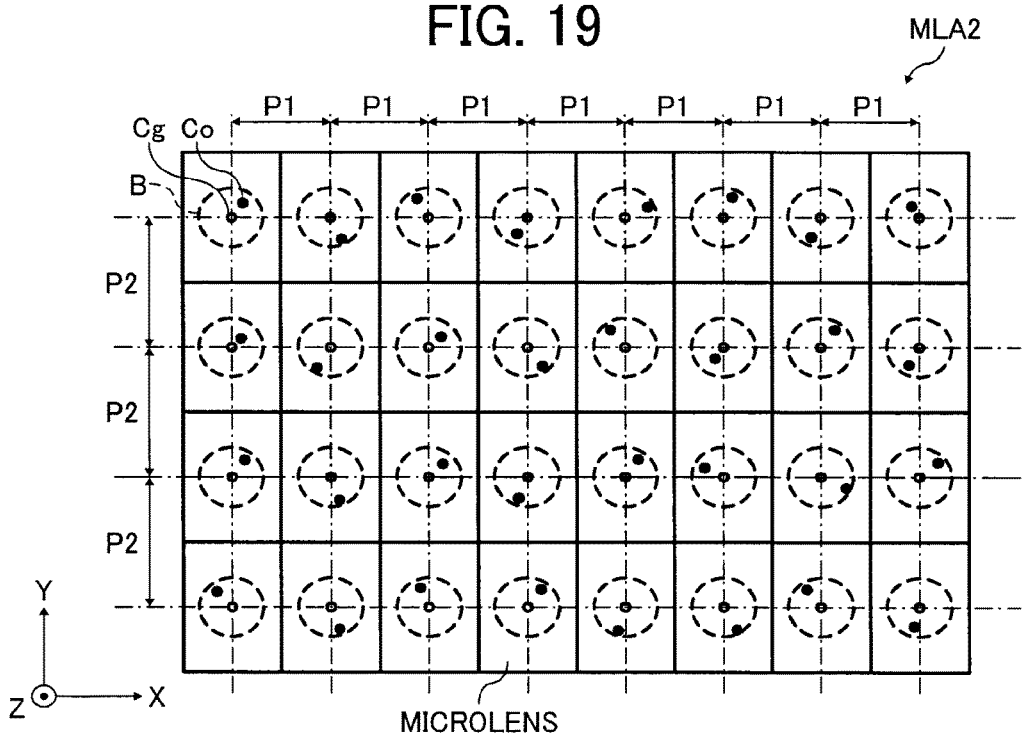

IMAGE DISPLAY DEVICE AND OBJECT APPARATUS

CROSS-REFERENCE TO RELATED APPLICATIONS

This patent application is based on and claims priority pursuant to 35 U.S.C. § 119(a) to Japanese Patent Application No. 2015-090944, filed on Apr. 28, 2015, in the Japan Patent Office, the entire disclosure of which is hereby incorporated by reference herein.

BACKGROUND

Technical Field

The present invention relates to an image display device and an object apparatus including the image display device.

Description of the Related Art

In the related art, there is known an image display device which forms an image by light, irradiates a micro-lens array with the light for forming the image, and guides light that has transmitted the micro-lens array to a transmitting and reflecting member (for example, a windshield of a mobile body).

However, in such image display device, it has been difficult to achieve miniaturization while suppressing degradation in image quality, for example, as disclosed in JP-2014-139655-A.

SUMMARY OF THE INVENTION

In one aspect of the present invention, an image display device includes a light source unit to emit light, an image forming element to form an image with the light emitted from the light source unit, a micro-lens array to be irradiated with the light forming the image, the micro-lens array including a plurality of lens columns arranged in a second direction, each lens column including micro-lenses being arranged in a first direction, the first direction and the second direction being perpendicular with each other, and a projection optical system to project light passing through the micro-lens array toward a transmitting and reflecting member. In such case, the condition B1<B2 and M1>M2 or B1>B2 and M1<M2 is satisfied. Here, M1 denotes an average value of first-directional distances between optical centers of the two micro-lenses adjacent to each other in the first direction in the lens column group. M2 denotes an average value of adjacent intervals between adjacent axes, the adjacent axes each passing through a second-directional average position of the optical centers of the plurality of micro-lenses of each lens column in the lens column group and extending in the first direction. B1 denotes a first-directional magnification ratio of an optical system including the projection optical system and the transmitting and reflecting member. B2 denotes a second-directional magnification ratio of the optical system.

In one aspect of the present invention, an image display device includes a light source unit to emit light, an image forming element to form an image with the light emitted from the light source unit, a micro-lens array to be irradiated with the light forming the image, the micro-lens array including a plurality of lens columns arranged in a second direction at a pitch P2, each lens column including a plurality of micro-lenses having geometrical centers being aligned in a first direction at a pitch P1, the first direction and the second direction being perpendicular with each other, and a projection optical system to project light passing through the micro-lens array toward a transmitting and reflecting member. In such case, the condition B1<B2 and P1>P2 or B1>B2 and P1<P2 is satisfied. B1 denotes a first-directional magnification ratio of an optical system including the projection optical system and the transmitting and reflecting member. B2 denotes a second-directional magnification ratio of the optical system.

BRIEF DESCRIPTION OF THE SEVERAL VIEWS OF THE DRAWINGS

A more complete appreciation of the disclosure and many of the attendant advantages and features thereof can be readily obtained and understood from the following detailed description referring to the accompanying drawings, wherein:

FIG. 11 is a diagram for explaining an optical deflector according to an embodiment of the present invention;

FIG. 13 is a diagram for explaining lens pitches of an MLA according to an embodiment of the present invention;

FIGS. 14A and 14B are diagrams for explaining honeycomb-shaped arrays of micro-lenses according to an embodiment of the present invention;

FIG. 18 is a diagram for explaining a micro-lens array (MLA1) of Example 1;

FIG. 19 is a diagram for explaining a micro-lens array (MLA2) of Example 2;

Figure 1A:
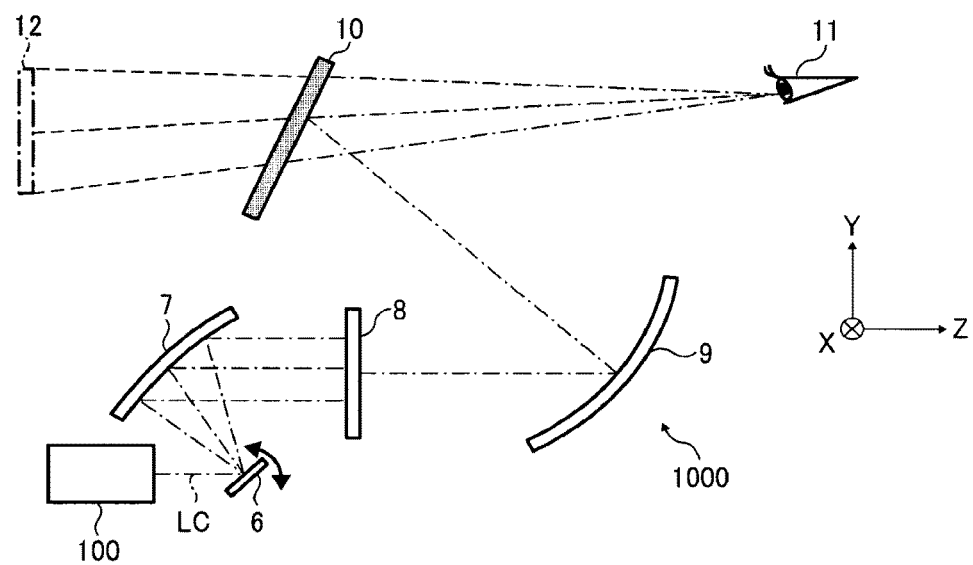
FIGS. 1A to 1C are diagrams for explaining an image display device according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF THE INVENTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that operate in a similar manner.

Figure 1B:
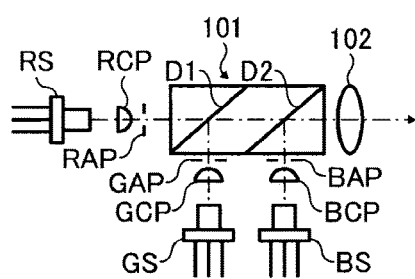
Figure 1C:
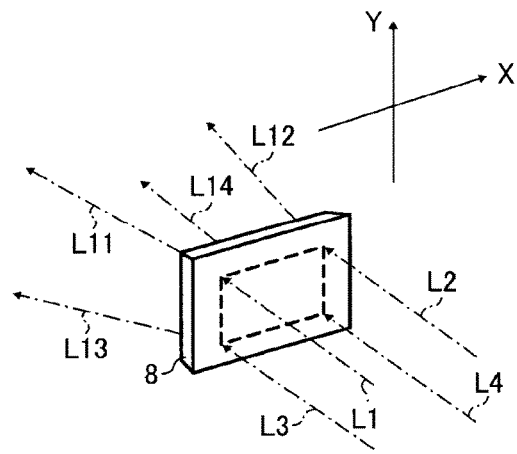

FIGS. 1A to 1C are diagrams for explaining an image display device according to an embodiment.

An image display device 1000 described referring to FIGS. 1A to 1C is a head-up display device which displays a two-dimensional color image, and an overall configuration of the device is illustrated in FIG. 1A as an explanation diagram.

As an example, the image display device 1000 is mounted on a mobile body such as a car, an airplane, and a ship and allows navigation information (for example, information such as speed and travel distance) necessary for steering the mobile body to be visually noticeable through a transmitting and reflecting member (for example, a windshield) installed in the mobile body. Hereinafter, an XYZ three-dimensional rectangular coordinate system (coordinate system moving together with the mobile body) set to the mobile body is appropriately used for description. In addition, the "transmitting and reflecting member" denotes a member which transmits a portion of incident light and reflects at least a portion of the remaining light.

In FIG. 1A, a component indicated by reference numeral 100 is a "light source unit", and pixel-display beam LC for color image display is emitted from the light source unit 100 in the +Z direction.

The pixel-display beam LC is a one beam obtained by combining three color beams of red (hereinafter, referred to as "R"), green (hereinafter, referred to as "G"), and blue (hereinafter, referred to as "B") beams.

Namely, the light source unit 100 has a configuration illustrated in, for example, FIG. 1B.

In FIG. 1B, semiconductor lasers as light sources indicated by reference numerals RS, GS, and BS emit R, G, and B laser beams, respectively. Herein, each semiconductor laser is implemented by a laser diode (LD), which may be called an edge-emitting laser. Alternatively, the semiconductor laser may be implemented by a surface-emitting laser (VCSEL), instead of the edge-emitting laser.

Coupling lenses indicated by reference numerals RCP, GCP, and BCP suppress divergence of the laser beams emitted from the semiconductor lasers RS, GS, and BS, respectively.

Color laser beam fluxes of which divergence is suppressed by the coupling lenses RCP, GCP, and BCP are shaped by apertures RAP, GAP, and BAP (diameters of the beam fluxes are restricted).

The shaped color laser beam fluxes are incident on beam combining prism 101.

The beam combining prism 101 includes a dichroic film D1 that transmits the R-color beam to reflect the G-color beam and a dichroic film D2 that transmits the R-color and G-color beams to reflect the B-color beam.

Therefore, the R, G, and B color laser beam fluxes are combined into one beam flux and the beam flux is emitted from the beam combining prism 101.

The emitted beam flux is converted into a "parallel beam" having a predetermined beam flux diameter by a lens 102.

The "parallel beam" is the pixel-display beam LC.

Each of the R-color, G-color, and B-color laser beam fluxes constituting the pixel-display beam LC is intensity-modulated according to image signals of a to-be-displayed "two-dimensional color image" (according to image information (image data)). The intensity modulation may be a direct modulation type of directly modulating a semiconductor laser or may be an external modulation type of modulating laser beam fluxes emitted from the semiconductor laser.

Namely, with respect to the semiconductor lasers RS, GS, and BS, emission intensities are modulated according to image signals of R-color, G-color, and B-color components by a driving unit.

The pixel-display beam LC emitted from the light source unit 100 is incident on a two-dimensional deflector 6 as an image forming element to be two-dimensionally deflected.

In the embodiment, the two-dimensional deflector 6 is configured so that a micro-mirror oscillates by setting "two perpendicular axes" as oscillation axes.

More specifically, the two-dimensional deflector 6 is a micro-electro-mechanical system (MEMS) manufactured as a micro-oscillating mirror element in a semiconductor process and the like.

The two-dimensional deflector is not limited thereto, but two-dimensional deflector having other configurations, for example, a combination of two micro-mirrors oscillating around one axis so that the oscillation directions are perpendicular to each other may be employed.

The pixel-display beam LC which is two-dimensionally deflected as described above is incident on a concave mirror 7 to be reflected toward a scanning-target surface element 8.

An optical function of the concave mirror 7 is to remove distortion of an image formed on a reflecting plane member 10 by the pixel-display beam LC which is two-dimensionally deflected.

While parallel-moving according to the deflection by the two-dimensional deflector 6, the pixel-display beam LC reflected by the concave mirror 7 is incident on the scanning-target surface element 8 to two-dimensionally scan the scanning-target surface element 8.

By the two-dimensional scanning, a "two-dimensional color image" is formed on the scanning-target surface element 8.

The image forming unit which forms an image by light includes the light source unit 100, the two-dimensional deflector 6, the concave mirror 7, and the scanning-target surface element 8.

Here, a pixel displayed on the scanning-target surface element 8 at each instant is "only the pixel which is irradiated with the pixel-display beam LC at the instant".

The two-dimensional color image is formed as a "set of pixels displayed at each instant" through the two-dimensional scanning by the pixel-display beam LC.

The "two-dimensional color image" is formed on the scanning-target surface element 8 as described above, and the pixel beam that is a pixel-unit beam (beam corresponding to each pixel) of the image information is incident on the concave mirror 9 to be reflected.

Although not illustrated in FIGS. 1A to 1C, the scanning-target surface element 8 has a later-described "micro-convex lens structure". The concave mirror 9 constitutes a "virtual image imaging forming optical system".

The "virtual image imaging forming optical system" forms a magnified virtual image 12 of the above-described "two-dimensional color image".

The reflecting plane member 10 is installed in front of the image forming position of the magnified virtual image 12 to reflect the beam flux forming the magnified virtual image 12 toward an observer 11 (an eye of the observer is illustrated in FIG. 1A) side. In this case, the concave mirror 9 constitutes a projection optical system which projects the pixel beam from the scanning-target surface element 8 toward the reflecting plane member 10. In addition, the observer 11 (for example, an operator operating the mobile body) visually notices a virtual image from a predetermined observation position (view point) on an optical path of the laser beam reflected by the reflecting plane member 10 (transmitting and reflecting member).

The observer 11 can visually notice the magnified virtual image 12 by the reflected beam.

As illustrated in FIG. 1A, the up-down direction of the figure is denoted by a "Y direction", and the direction perpendicular to the figure is denoted by an "X direction".

In the case illustrated in FIG. 1A, in general, the Y direction is the up-down direction with respect to the observer 11, and this direction is called the "vertical direction".

In addition, in general, the X direction is the left-right direction with respect to the observer, and this direction is called the "lateral direction".

As described above, the scanning-target surface element 8 has a micro-convex lens structure.

As described later, the micro-convex lens structure is a structure where "a plurality of micro-convex lenses are arranged to be in close contact with each other at a pitch approximate to a pixel pitch". In addition, hereinafter, although the micro-convex lens structure is described, the same functions and effects can be obtained with respect to a micro-concave lens structure where "a plurality of micro-concave lenses are arranged to be in close contact with each other at a pitch approximate to a pixel pitch".

Herein, the plurality of micro-convex lenses are two-dimensionally arranged at a predetermined pitch along a plane (XY plane) perpendicular to the Z direction so that the convex surface becomes the incident surface. As a specific array form thereof, there are a matrix-shaped array where the X direction is set as a row (lateral) direction and the Y direction is set as a column (vertical) direction and a honeycomb-shaped array.

The planar shape (shape viewed from the Z direction) of each micro-convex lens is, for example, a circle, a regular N-polygon (N is a natural number of 3 or more), or the like. Herein, the micro-convex lenses have the same curvature (radius of curvature).

Each micro-convex lens has a function of isotropically diffusing the pixel-display beam LC. Namely, each micro-convex lens has a uniform diffusion power over all directions. Hereinafter, the "diffusion function" will be described in brief.

In FIG. 1C, reference numerals L1 to L4 denote four pixel-display beams which are incident on the scanning-target surface element 8.

The four pixel-display beams L1 to L4 are set as pixel-display beams which are incident on four corners of the two-dimensional image formed on the scanning-target surface element 8.

The four pixel-display beams L1 to L4 passing through the scanning-target surface element 8 are converted into beams L11 to L14.

If a beam flux of which cross section is a horizontally-elongated quadrilateral surrounded by the pixel-display beams L1 to L4 is incident on the scanning-target surface element 8, the beam flux becomes a "diverging beam flux of which cross section is a horizontally-elongated quadrilateral surrounded by the beams L11 to L14".

The function of the micro-convex lens is the "diffusion function".

The "diverging beam flux surrounded by the beams L11 to L14" is a result of temporal accumulation of the pixel-display beams which are converted to the diverging beam flux.

The diffusion of the pixel-display beam is performed in order that "a wide area in the vicinity of the eye of the observer 11 is irradiated with the beam flux reflected by the reflecting plane member 10".

In the case where there is no diffusion function, "only a narrow area in the vicinity of the eye of the observer 11 is irradiated with the beam flux reflected by the reflecting plane member 10".

Therefore, if the observer 11 moves the head so that the position of the eye is deviated from the above-described "narrow area", the observer 11 cannot visually notice the magnified virtual image 12.

As described above, by diffusing the pixel-display beam LC, the "wide area in the vicinity of the eye of the observer 11" is irradiated with the reflected beam flux by the reflecting plane member 10".

Therefore, even though the observer "slightly moves the head", the observer can securely visually notice the magnified virtual image 12.

As described above, in the embodiment, although the pixel-display beam LC incident on the scanning-target surface element 8 is a parallel beam, the beam becomes a diverging beam after the beam passes through the scanning-target surface element 8.

In the present embodiment, the scanning-target surface element 8 has a "micro-convex lens structure" where the plurality of micro-convex lenses which diffuse the pixel-display beam LC are arranged to be in close contact with each other at a pitch approximate to a pixel pitch".

The micro-convex lens is larger than a "beam diameter of the pixel-display beam LC".

The reason why the micro-convex lens is set to be larger than a "beam diameter of the pixel-display beam LC" is to achieve reduction of coherent noise, and hereinafter, this will be described referring to FIGS. 2A and 2B and FIGS. 3A to 3C.

Figure 2A:
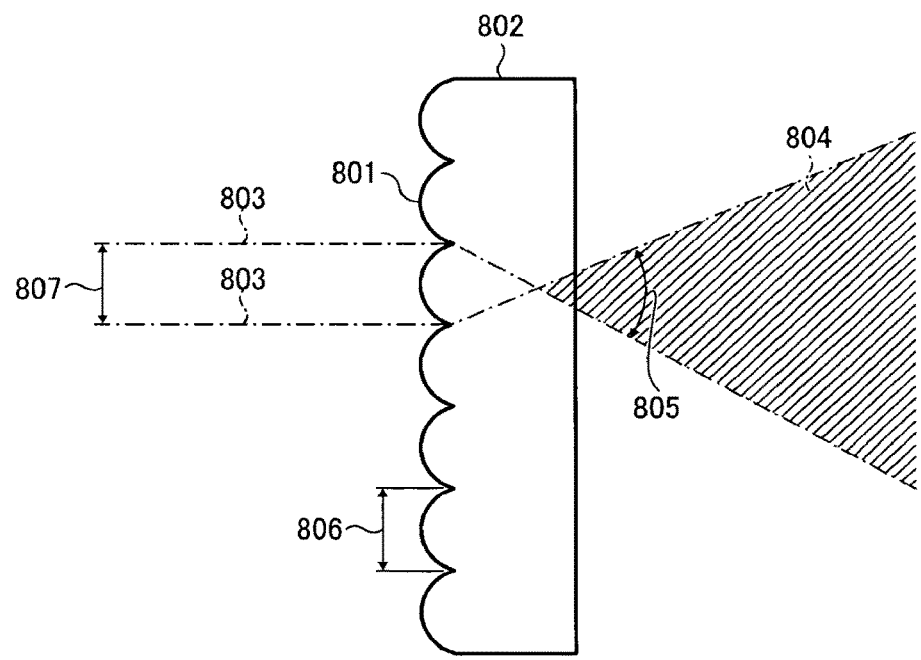
FIGS. 2A and 2B are diagrams for explaining diffusion by micro-convex lenses and generation of coherent noise according to an embodiment of the present invention.

In FIG. 2A, reference numeral 802 denotes a scanning-target surface element.

The scanning-target surface element 802 has a micro-convex lens structure where micro-convex lenses 801 are arranged.

A beam flux diameter 807 of a "pixel-display beam" denoted by reference numeral 803 is smaller than a size of the micro-convex lens 801.

Namely, a size 806 of the micro-convex lens 801 is larger than the beam flux diameter 807.

In addition, in the embodiment, the pixel-display beam 803 is a laser beam flux and has a light intensity distribution in a Gaussian distribution form around the center of the beam flux.

Therefore, the beam flux diameter 807 is the beam flux radial distance where the light intensity in the light intensity distribution is decreased to "$1/e^2$".

In FIG. 2A, although the beam flux diameter 807 is illustrated so that the size thereof is equal to the size 806 of the micro-convex lens 801, the size of the beam flux diameter 807 is not necessarily equal to the "size 806 of the micro-convex lens 801".

It is favorable that the size thereof does not exceed the size 806 of the micro-convex lens 801.

In FIG. 2A, the entire pixel-display beam 803 is incident on the one micro-convex lens 801 and is converted to a diffusing beam flux 804 having a divergent angle 805.

In addition, hereinafter, the "divergent angle" is sometimes referred to as a "diffusion angle".

In the state of FIG. 2A, since there is one diffusing beam flux 804 and there is no interfering beam flux, coherent noise (speckle noise) does not occur.

In addition, the size of the divergent angle 805 can be appropriately set according to a shape of the micro-convex lens 801.

Figure 2B:
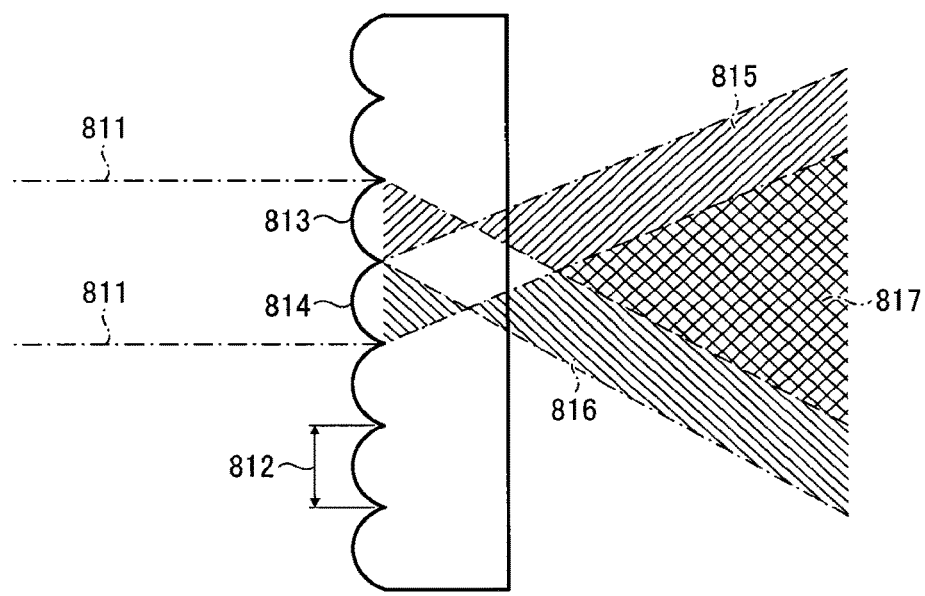

In FIG. 2B, the beam flux diameter of the pixel-display beam 811 is two times the arrangement pitch 812 of the micro-convex lenses, and the pixel-display beam 811 is incident across two micro-convex lenses 813 and 814.

In this case, the pixel-display beam 811 is diffused into two diverging beam fluxes 815 and 816 by the two micro-convex lenses 813 and 814 on which the pixel-display beam is incident.

The two diverging beam fluxes 815 and 816 overlap each other in an area 817 to interfere with each other in this portion, so that coherent noise occurs.

Figure 3A:
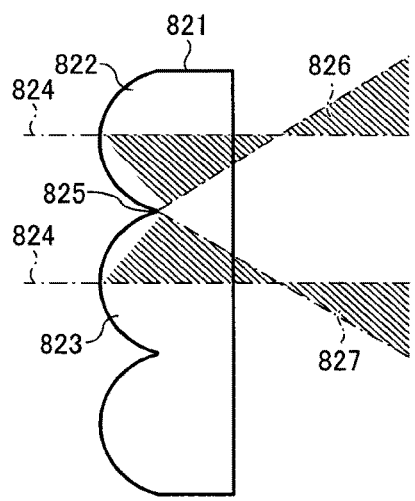
FIGS. 3A to 3C are diagrams for explaining removal of coherent noise according to an embodiment of the present invention.

FIG. 3A illustrates a state that a pixel-display beam 824 is incident across two micro-convex lenses 822 and 823 of a scanning-target surface element 821.

The beam flux diameter of the pixel-display beam 824 is equal to the size of the micro-convex lens 822 or the like.

In this case, the beam portion incident on the micro-convex lens 822 becomes a diverging beam flux 826 to be diffused, and the beam portion incident on the micro-convex lens 823 becomes a diverging beam flux 827 to be diffused.

The diverging beam fluxes 826 and 827 are diffused in such a direction that the fluxes are separated away from each other, and thus, the fluxes do not overlap each other. Therefore, in this state, coherent noise does not occur.

Namely, if the beam diameter of the pixel-display beam 824 is set to be equal to or smaller than the size of the micro-convex lens 822, the coherent noise due to the beam fluxes diffused by the micro-convex lens does not occur.

An example of specific numerical values of the diameter of the micro-convex lens and the beam diameter of the pixel-display beam incident on the scanning-target surface element is exemplified.

For example, the beam diameter of the pixel-display beam is easily set to be about 150 µm.

In this case, the size of the micro-convex lens constituting the micro-convex lens structure is favorably set to be the above-described size of 150 µm or more, for example, 160 µm, 200 µm, or the like.

In the scanning-target surface element 821 illustrated in FIG. 3A, the micro-convex lenses 822, 823, . . . are arranged without gap.

Therefore, a "width of the boundary portion (hereinafter, sometimes referred to as a "boundary width") of the adjacent micro-convex lens surfaces is 0".

For this reason, diverging beam fluxes generated from the pixel-display beam 824 incident on the micro-convex lenses 822 and 823 as illustrated in FIG. 3A are only the diverging beam fluxes 826 and 827.

However, in an actually-formed micro-convex lens structure, there is no case where the "boundary width between the adjacent micro-convex lenses is 0".

Figure 3B:
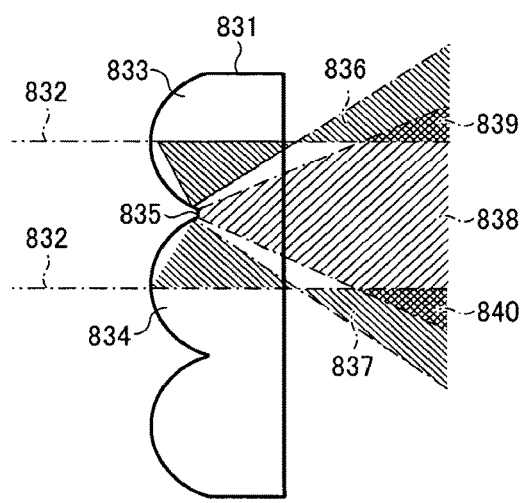

Namely, similarly to a scanning-target surface element 831 illustrated in FIG. 3B, in an actually-formed micro-convex lens structure, there is no case where the "width of a boundary portion 835 between micro-convex lenses 833 and 834 is 0".

In the boundary portion 835 between the micro-convex lenses 833 and 834, microscopically, a "curved surface is formed to be smoothly continuous", and thus, a curved surface is formed in the boundary portion 835.

If the pixel-display beam is incident on this portion, the curved surface formed in the boundary portion 835 in this manner functions as a "micro-lens surface" with respect to the incident beam portion.

Therefore, the pixel-display beam 832 incident across the micro-convex lenses 833 and 834 causes a diverging beam flux 838 as well as diverging beam fluxes 836 and 837 to be generated.

The diverging beam flux 838 occurs due to the lens function of the curved surface of the boundary portion 835 and overlaps and interferes with the diverging beam fluxes 836 and 837 in areas 839 and 840, so that coherent noise occurs.

Figure 3C:
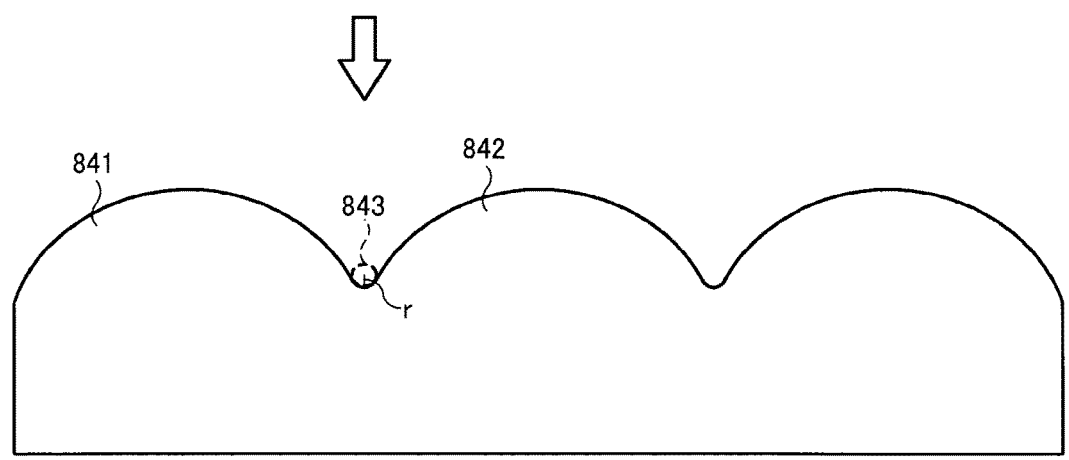

FIG. 3C is a diagram for explaining "reduction and prevention of the coherent noise" in a micro-convex lens structure.

In the micro-convex lens structure, a curved-surface shape itself of a boundary portion 843 where lens surfaces of micro-convex lenses 841 and 842 are gently connected forms a "micro-lens surface".

The radius of curvature of the curved-surface shape of the boundary portion 843 is denoted by r as illustrated in FIG. 3C.

Herein, for simplification of the description, a pixel-display beam incident on the micro-convex lens structure is referred to as a "wavelength-? monochrome laser beam flux".

In a case where the radius of curvature r of the boundary portion 843 is larger than the wavelength $\lambda$, of the pixel-display beam (r>$\lambda$), the curved surface having a radius of curvature r has a lens function on the incident pixel-display beam.

Therefore, in this case, the beam component passing through the boundary portion 843 diverges and overlaps and interferes with beam fluxes diffused by the micro-convex lenses 841 and 842, so that coherent noise occurs.

On the other hand, if the radius of curvature r of the boundary portion 843 is smaller than the wavelength $\lambda$ of the pixel-display beam, the boundary portion 843 has a "sub-wavelength structure" with respect to the pixel-display beam.

As well known, the sub-wavelength structure does not cause a lens function on the "light having a wavelength larger than the sub-wavelength structure".

Therefore, the boundary portion 843 having a radius of curvature r smaller than the wavelength $\lambda$, does not function as a "lens" but straightly transmits the pixel-display beam without divergence.

Therefore, the beam portion straightly passing through the boundary portion 843 and the diverging beam fluxes diffused by the micro-convex lenses 841 and 842 does not overlap each other, so that the coherent noise due to interference does not occur.

Namely, the magnitude relationship among the beam diameter d of the pixel-display beam, the wavelength $\lambda$, the size D of the micro-convex lens, and the radius of curvature r of the surface constituting the boundary portion are favorably defined as follows.

$$D > d, \lambda > r$$

In a case where the two-dimensional magnified virtual image which is to be displayed is monochrome image, the pixel-display beam is formed by monochromatic coherent light having a wavelength $\lambda$.

Therefore, in this case, the D, d, r, and $\lambda$, are set so as to satisfy the above-described magnitude relationship, so that the coherent noise can be suppressed.

Like the embodiment, in the case of displaying a two-dimensional color image (magnified virtual image), the pixel-display beam LC is a combination of three R-color, G-color, and B-color beams.

When the wavelengths of the three beams are denoted by $\lambda R$ (=640 nm), $\lambda G$ (=510 nm), and $\lambda B$ (=445 nm), the magnitude relationship is that "$\lambda R > \lambda G > \lambda B$".

Therefore, in terms of prevention of coherent noise, the radius of curvature r of the surface constituting the boundary portion is favorably set to be smaller than the shortest wavelength $\lambda B$, for example, to be 400 nm.

However, if the radius of curvature r is set to be smaller than the longest wavelength $\lambda R$ (for example, to be 600 nm), the coherent noise due to the R component of the image display beam can be prevented.

Namely, the coherent noise can be effectively reduced.

If "r (for example, 500 nm)<$\lambda G$" is set, the coherent noise due to the R-component and G-component beams of the image display beam can be prevented.

In a case where the pixel-display beam LC is a "combination of three R-color, G-color, and B-color beams", the coherent noise occurs independently with respect to the three color components.

The "sum" of the independent coherent noise due to the three R-color, G-color, and B-color beams becomes visually noticeable coherent noise.

Therefore, among the coherent noise due to three colors, if any coherent noise due to one color disappears, the visually noticeable coherent noise is greatly improved, which contributes to improvement of image quality of an observation image.

Therefore, with respect to the effect of prevention of coherent noise, the effect can be obtained in associated with only the "longest-wavelength R component" among the three color components, and next, the "reduction effect" is improved in the order of the G component and the B component.

Therefore, if the radius of curvature r is set to be smaller than the longest wavelength $\lambda R$ (for example, to be 600 nm), in addition to the reduction of coherent noise, a certain effect can be achieved.

With respect to the visibility of the coherent noise, noise intensity varies with the wavelength, the beam diameter, the multi/single modes, or the like, but in general, the visibility is increased in the order of R$\approx$G>B.

Namely, the visibility of a human eye is low with respect to the light having a wavelength $\lambda B$, and thus, the coherent noise is difficult to visually notice by eye.

Therefore, if the radius of curvature r is set to be smaller than the wavelength $\lambda G$ (for example, to be 500 nm), the coherent noise due to the light having wavelengths $\lambda R$ and $\lambda G$ of which visibility is relatively high can be reduced, Although the coherent noise due to the light having wavelength $\lambda B$ of which visibility is low occurs, the coherent noise is not securely visually noticeable.

Of course, if the radius of curvature r is set to be smaller than the wavelength $\lambda B$ (for example, to be 400 nm), as described above, the coherent noise can be more effectively reduced.

Each size of the plurality of micro-convex lenses constituting the micro-convex lens structure is in the order of 100 μm as described above, and this can be implemented as a general "micro-lens".

In addition, the micro-convex lens structure where the plurality of micro-convex lenses are arranged can be implemented as a "micro-lens array".

Therefore, hereinafter, the micro-convex lens is sometimes called a "micro-lens", and the micro-convex lens structure is sometimes called a "micro-lens array".

In general, the micro-lens array is manufactured by producing a mold having a transfer surface of a lens surface array of the micro-lens array and transferring a mold surface to a resin material by using the mold.

With respect to formation of the transfer surface of the mold, there is well known a method of forming the transfer surface by using cutting, photolithography, and the like.

In addition, the transferring of the transfer surface to the resin material can be performed, for example, by "injection molding".

The reduction of the radius of curvature of the boundary portion between the adjacent micro-lenses can be implemented by reducing the boundary width.

The small boundary width can be implemented by "sharpening" the boundary portion formed between the adjacent micro-lens surfaces.

In the mold for micro-lens array, as a method of reducing the size of the "boundary width between the adjacent micro-lenses" down to the order of wavelength, there are known various methods.

For example, JP-4200223-B discloses a method of increasing the radius of curvature of each micro-lens by anisotropic etching and ion processing to remove non-lens portions of the boundary portion.

In addition, JP-5010445-B discloses a method of removing a flat surface between adjacent micro-lenses by using isotropic dry etching.

For example, by using the above-described well-known methods, it is possible to manufacture a micro-lens array where the radius of curvature of the surface constituting the boundary portion between the adjacent micro-lenses is sufficiently small.

Namely, the above-described scanning-target surface element can be configured as a micro-lens array having a structure where a plurality of micro-lenses are arranged to be in close contact with each other.

By forming the micro-lens array where the radius of curvature r of the surface constituting the boundary portion between the adjacent micro-lenses is smaller than 640 nm, the coherent noise due to the R component beam can be prevented.

In addition, by forming the micro-lens array where the radius of curvature r is smaller than 510 nm, the coherent noise due to the R component beam and the G component beam can be prevented.

By forming the micro-lens array where the radius of curvature r of the surface constituting the boundary portion between the adjacent micro-lenses is smaller than 455 nm, the coherent noise due to the R, G, and B component beams can be prevented.

Heretofore, the image display device (head-up display device) illustrated in FIGS. 1A to 1C was described.

The concave mirror 7 illustrated in FIGS. 1A to 1C has a "function of removing the distortion of the image formed on the reflecting plane member 10 by the pixel-display beam LC which is two-dimensionally deflected".

Namely, the concave mirror 7 functions as a "deflection range restriction unit that restricts a scan range of the scanning-target surface element by adjusting a deflection range of the pixel-display beam which is two-dimensionally deflected.

In a case where a deflection angle of the pixel-display beam which is two-dimensionally deflected by the two-dimensional deflector 6 is not greatly large, the deflection range restriction unit may be omitted.

Conditions of the micro-convex lens structure (micro-lens array) and the micro-convex lenses (micro-lenses) are the same as those described above.

Namely, "a micro-convex lens structure is configured so that a plurality of micro-convex lenses which are larger than a beam diameter of a pixel-display beam are arranged to be in close contact with each other at a pitch approximate to a pixel pitch".

Figure 4A:
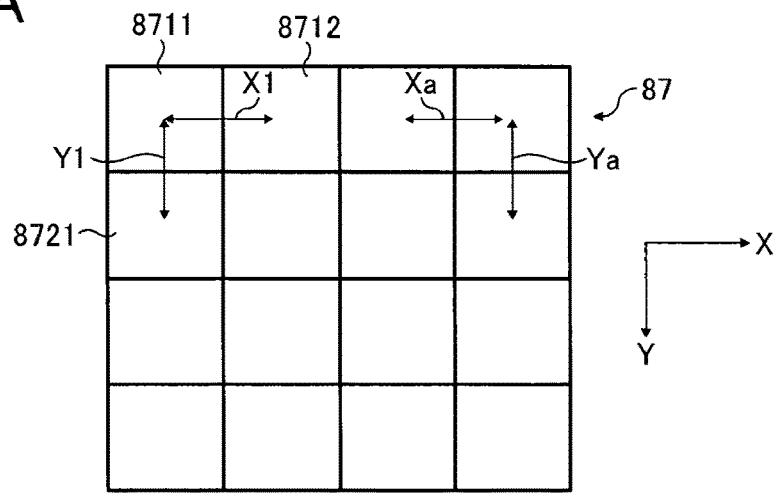
FIGS. 4A to 4C are three exemplary diagrams illustrating examples of array forms of micro-convex lenses according to an embodiment of the present invention.
Figure 4B:
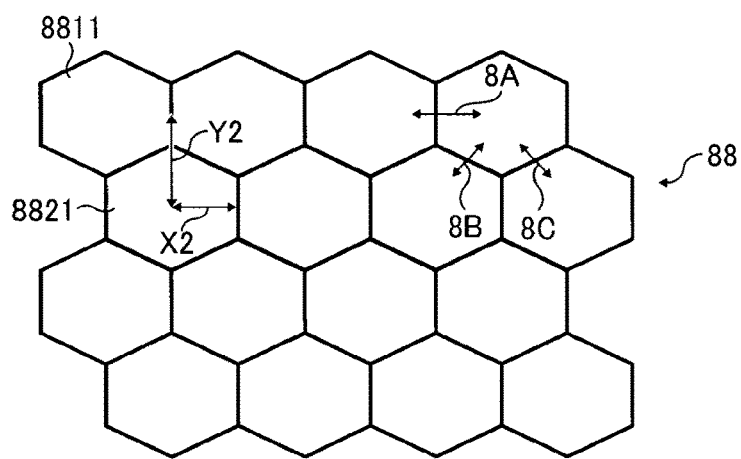
Figure 4C:
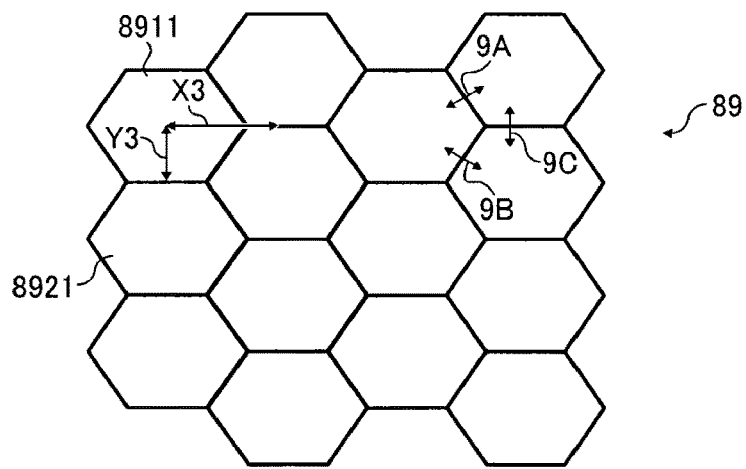

Herein, three examples of specific forms of the micro-lens array satisfying the conditions are illustrated in FIGS. 4A to 4C.

A micro-lens array 87 as a form example illustrated in FIG. 4A is configured so that square-shaped micro-lenses 8711, 8712, . . . and the like are arranged in a square matrix shape.

The number of pixels of a two-dimensional image (magnified virtual image) displayed in the head-up display device is determined by an arrangement period of the micro-lenses in the micro-lens array.

In the array of FIG. 4A, the distance between the centers of micro-lenses 8711 and 8712 adjacent to each other in the X direction is denoted by X1.

In addition, in FIG. 4A, the distance between the centers of the micro-lenses 8711 and 8721 adjacent to each other in the Y direction is denoted by Y1. The X1 and Y1 can be regarded as an "effective size of one pixel".

Hereinafter, the "effective size of one pixel" is sometimes referred as an "effective pitch of one pixel" or an "effective pixel pitch".

A micro-lens array 88 as a form example illustrated in FIG. 4B is configured so that regular-hexagon-shaped micro-lenses 8811, 8821, . . . are arranged to be in close contact with each other.

In the micro-lens array of this case, the arranged micro-lenses 8811 and the like do not have sides parallel to the X direction.

Namely, since upper sides and lower sides of the micro-lenses arranged in the X direction have a "zigzag shape", the array is called a "zigzag-type array".

A micro-lens array 89 as a form example illustrated in FIG. 4C is configured so that regular-hexagon-shaped micro-lenses 8911, 8921, . . . are arranged to be in close contact with each other.

In the micro-lens array of this case, the arranged micro-lenses 8911 and the like have sides parallel to the X direction. The array of this case is called an "armchair-type array".

The zigzag-type array and the armchair-type array are collectively called a "honeycomb-type array".

The armchair-type array illustrated in FIG. 4C is an array obtained by rotating the zigzag-type array illustrated in FIG. 4B by 90 degrees.

In the zigzag-type array, in the micro-lens array, X2 illustrated in FIG. 4B can be regarded as an "X-directional effective pixel pitch", and Y2 can be regarded as a "Y-directional effective pixel pitch".

In the armchair-type array, X3 illustrated in FIG. 4C can be regarded as an "X-directional effective pixel pitch", and Y3 can be regarded as a "Y-directional effective pixel pitch".

In FIG. 4B, the effective pixel pitch Y2 is a distance between the center of the micro-lens 8821 and the central point of the right side of the micro-lens 8811.

In FIG. 4C, the effective pixel pitch X3 is a distance between the central point of the side with which two micro-lenses contacting the right side of the micro-lens 8911 are in contact and the center of the micro-lens 8911.

In the zigzag-type array, since the X-directional effective pixel pitch X2 is small, the X-directional resolution in the image display can be improved.

In addition, in the armchair-type array, the Y-directional resolution can be improved.

In this manner, by arranging the micro-lenses in a honeycomb type, the pixels which are smaller than an actual lens diameter can be effectively represented, so that the number of effective pixels can be increased.

As described above in the micro-convex lens structure (micro-lens array) of the scanning-target surface element, the boundary portion between the adjacent micro-lenses has a radius of curvature r.

The radius of curvature r is smaller than, for example, the wavelength $\lambda R$ of the R component of the pixel-display beam.

Therefore, as described above, the "coherent noise due to interference of the coherent light of the R component" is prevented.

However, if the radius of curvature r is larger than the wavelength $\lambda G$ of the G component beam and the wavelength λB of the B component beam of the pixel-display beam, these beams are diffused in the boundary portion to interfere with each other.

Therefore, the coherent noise occurs due to the interference.

In this case, in the "square-matrix-shaped array" of FIG. 4A, the divergence (diffusion) in the boundary portion occurs in two directions of Xa and Ya directions of FIG. 4A, which causes the coherent noise.

In contrast, in the array of FIG. 4B, the divergence of the boundary portion occurs in three directions 8A, 8B, and 8C. In addition, in the case of FIG. 4C, the diffusion occurs in three directions 9A, 9B, and 9C.

Namely, in the square-matrix-shaped array, the divergence in the boundary portion occurs in two directions, and in the honeycomb-shaped array, the divergence occurs in three directions.

Therefore, in the square-matrix-shaped array, the coherent noise occurs in two directions, and in the honeycomb-shaped array, the coherent noise occurs in three directions.

Namely, the generated coherent noise is "dispersed in two directions" in a square-matrix-shaped array, whereas the generated coherent noise is "dispersed in three directions" in a honeycomb-shaped array.

The maximum intensity of the coherent light generating the coherent noise is constant.

Therefore, as the number of dispersion directions becomes large, the "contrast of the generated coherent noise" can be allowed to be weak, so that the coherent noise is difficult to visually notice (inconspicuous).

Therefore, in a case where the generation of the "coherent noise due to the component having a wavelength smaller than the radius of curvature r of the boundary portion" is allowed, the micro-lens array is favorably set to a "honeycomb-shaped array".

In addition, in a case where the boundary width is larger than the wavelength λR, the coherent noise due to the coherent light of the R component is also generated.

However, the "boundary width between the lens surfaces" of the adjacent micro-convex lenses is small, and the light energy of the coherent light incident on the portion having a small boundary width is small.

Therefore, the light energy generating the coherent noise is not large.

Therefore, although the coherent noise is generated, even in the case of a honeycomb-shaped array, as described above, the coherent noise is dispersed in three directions, so that the contrast becomes weak.

Therefore, the visibility of the coherent noise is effectively reduced.

As described referring to FIG. 1A, a virtual image imaging forming optical system which forms the two-dimensional magnified virtual image 12 is configured with the concave mirror 9.

Namely, the magnified virtual image 12 is a set of pixel images formed by the concave mirror 9.

If the micro-lenses as the micro-convex lenses are allowed to have an "anamorphic function", the diffusion function of the micro-convex lens can be allowed to be different between the directions perpendicular to each other.

Figure 6A:
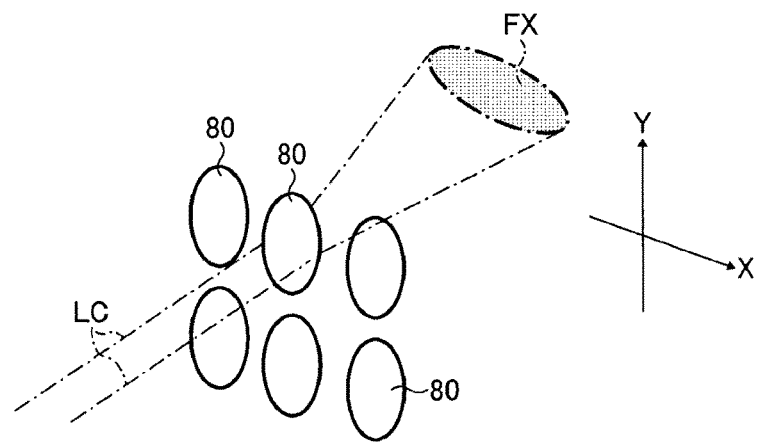
FIGS. 6A and 6B are diagrams for explaining an anamorphic micro-convex lens according to an embodiment of the present invention.
Figure 6B:
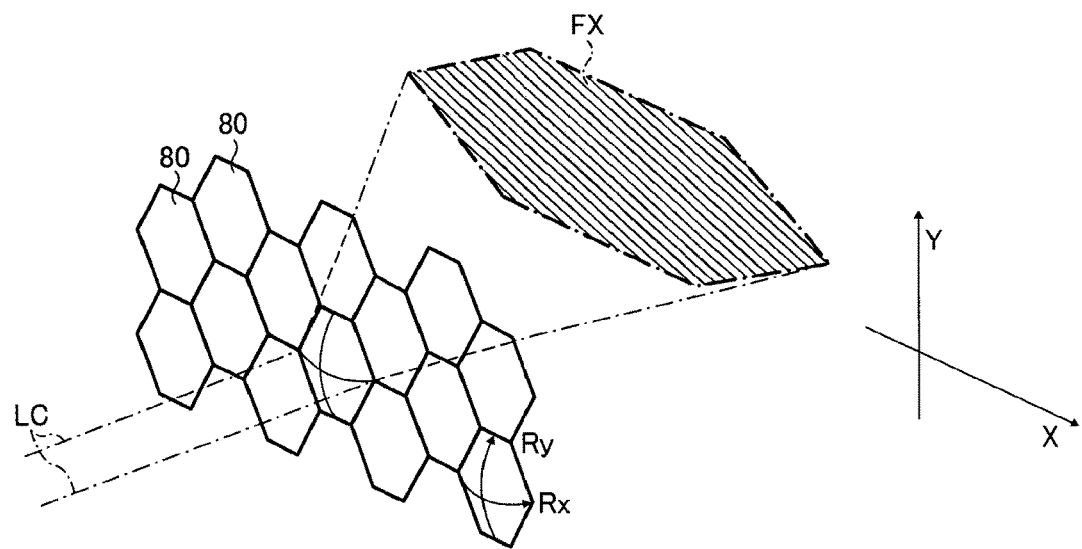

Referring to FIGS. 6A and 6B, in FIGS. 6A and 6B, reference numeral 80 denotes each of the micro-lenses (micro-convex lenses) which are formed to be in close contact with each other in the scanning-target surface element 8 as explanation diagrams. In the example of FIG. 6A, the micro-convex lenses have a vertically-elongated elliptic shape and are arranged in a "matrix-shaped array".

In the example of FIG. 6B, the micro-convex lenses 80 have vertically-elongated hexagon shapes having sides parallel to the X direction and are arranged in an "armchair-type array".

In the micro-convex lens 80, the radius of curvatures of the lens surface are different between the X direction and the Y direction, and the X-directional radius of curvature Rx is smaller than the Y-directional radius of curvature Ry. Namely, the X-directional curvature of the micro-convex lens 80 is larger than the Y-directional curvature thereof.

Therefore, the X-directional power (diffusion power) of the micro-convex lens 80 is larger than the Y-directional power (diffusion power) thereof.

In addition, since the lens surface has curvatures in both of the X and Y directions, as illustrated in FIG. 6B, the micro-convex lens can be formed to have a hexagon shape, so that the "visibility of the coherent noise" can be weakened as described above.

FIGS. 6A and 6B illustrate the cases where the pixel-display beam LC is incident on one micro-convex lens 80. In FIGS. 6A and 6B, the Y-directional width of each micro-convex lens 80 is larger than the X-directional width thereof.

In addition, as illustrated in FIG. 6A, the pixel-display beam LC is formed as an "elliptic shape where the beam diameter thereof is long in the Y direction", and the beam flux diameter in the Y direction is set to be smaller than the Y-directional diameter of the micro-convex lens 80.

According to this configuration, the pixel-display beam LC can be allowed to be "incident without crossing the lens boundary", and the shape of the cross section of the emitting diverging beam flux has a (horizontally-elongated) elliptic shape where the beam diameter is long in the X direction.

If the X-directional curvature is larger than the Y-directional curvature irrespective of the Y-directional distance and the X-directional distance of the micro-convex lens, in the beam flux cross section FX of the diverging beam emitted from each micro-convex lens, the Y-directional diameter is larger than the X-directional diameter. Namely, the beam is horizontally elongated.

The above-described head-up display device can be used, for example, to be mounted on a car or the like, and thus, the X direction is the "lateral direction as viewed from the driver's seat", and the Y direction is the "vertical direction".

The reflecting plane member 10 of this case is a windshield of the car.

In this case, for example, a "navigation image" can be displayed as the magnified virtual image 12 in front of the windshield, and thus, a driver as the observer 11 can observe the image almost without moving the line of sight from the front of the windshield while existing in the driver's seat.

In this case, as described above, in general, it is preferable that the displayed magnified virtual image is an "horizontally-elongated image as viewed from the driver", namely, that the image formed in the micro-lenses and the magnified virtual image are an image having an angle of view large in the X direction, that is, a horizontally-elongated image.

In addition, as described above, even in a case where the driver as the observer views the display image from the left and right inclined directions, in order to recognize the display, a "large viewing angle" is required for the lateral direction "in comparison with the vertical direction".

For this reason, a large diffusion angle (anisotropic diffusion) is required for the long direction (X direction) of the magnified virtual image in comparison with the short direction (Y direction).

Therefore, it is preferable that the micro-convex lens of the scanning-target surface element is configured with an anamorphic lens where the curvature in the long direction of the image or the magnified virtual image formed on the micro-lens is larger than the curvature in the short direction thereof, and "the diffusion angle of diffusing the pixel-display beam in the lateral direction of the two-dimensional image is set to be wider than the diffusion angle in the vertical direction".

By doing so, the light is allowed to diverge within a necessary minimum range that the angle of view required for the head-up display device is satisfied, and thus, light utilization efficiency can be improved, and brightness of the display image can be improved.

Of course, instead of the above-described "anisotropic diffusion", "isotropic diffusion" where the diffusion angles are the same in the vertical direction and the lateral direction is also available.

However, even in a case where the head-up display device used to be mounted on the car, there are few cases where the driver observes the display image from the positions in the up and down directions.

Therefore, in these cases, as described above, in terms of the light utilization efficiency, it is preferable that "the diffusion angle of diffusing the pixel-display beam in the lateral direction of the two-dimensional image is set to be wider than the diffusion angle in the vertical direction".

From the related art, it is known that the lens surface of the micro-convex lens (micro-lens) can be formed as an "aspherical surface".

Although the anamorphic lens surface described just above is also an "aspherical surface", the lens surface of the micro-convex lens can be formed as a more general aspherical surface, so that aberration correction can be performed.

Due to the aberration correction, "intensity unevenness of the diffusion" can be reduced.

Each of the micro-convex lenses (micro-lenses) in the micro-convex lens structure (micro-lens array) illustrated in FIGS. 4A to 4C has a square shape or a regular hexagon shape.

The shape of the micro-convex lens is not necessarily a regular polygon shape as described above, but shapes obtained by stretching the shapes of the micro-lenses illustrated in FIGS. 4A to 4C in one direction may also be available.

In this case, the square shape becomes a "rectangle shape", and the regular polygon shape becomes an elongated deformed polygon shape.

With respect to the effective pixel pitch of the micro-convex lens structure, in the arrays of FIGS. 4A to 4C, the effective pixel pitches in the X direction are denoted by X1 to X3, and the effective pixel pitches in the Y direction are denoted by Y1 to Y3.

When the X-directional effective pixel pitch defined as described above is generally denoted by "SX" and the Y-directional effective pixel pitch defined as described above is generally denoted by "SY", a ratio SY/SX of the both effective pixel pitches is referred to as an "aspect ratio".

In the case of FIG. 4A, since the aspect ratio is "Y1/X1" and X1=Y1, the aspect ratio is 1.

In the case of FIG. 4B, since the aspect ratio is "Y2/X2" and Y2>X1, the aspect ratio is larger than 1.

In the case of FIG. 4C, since the aspect ratio is "Y3/X3" and Y3<X3, the aspect ratio is smaller than 1.

In micro-convex lens structures of micro-lens arrays 91 to 95 illustrated in FIGS. 5A to 5E, similarly to the cases of FIGS. 4A to 4C, the effective pixel pitches are defined as follows.

Namely, the X-directional and Y-directional effective pixel pitches are "X11 and Y11", "X12 and Y12", and "X13 and Y13" of FIGS. 5A to 5E.

Figure 5A:
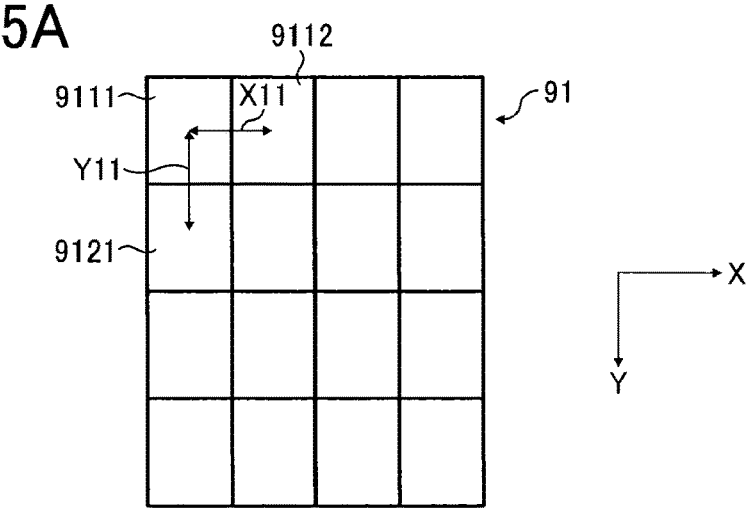
FIGS. 5A to 5E are five exemplary diagrams illustrating other examples of array forms of micro-convex lenses according to an embodiment of the present invention.

In the micro-convex lens structure of FIG. 5A, rectangle-shaped micro-convex lenses 9111, 9112, . . . , 9121, . . . are arranged in a square matrix shape, and the aspect ratio is larger than 1.

In the micro-lens arrays 92 to 95 illustrated in FIGS. 5B to 5E, the micro-convex lens structures are honeycomb-type arrays.

Figure 5B:
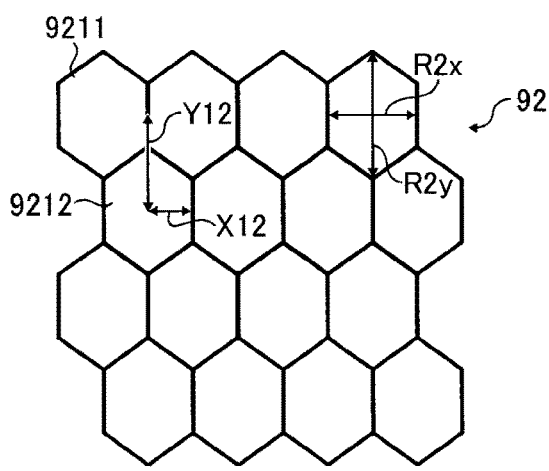
Figure 5C:
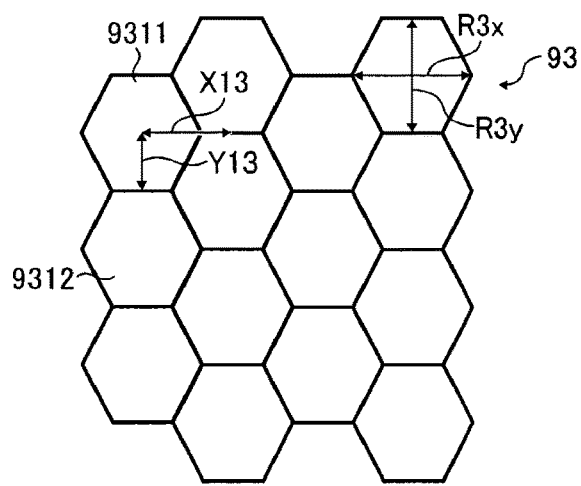
Figure 5D:
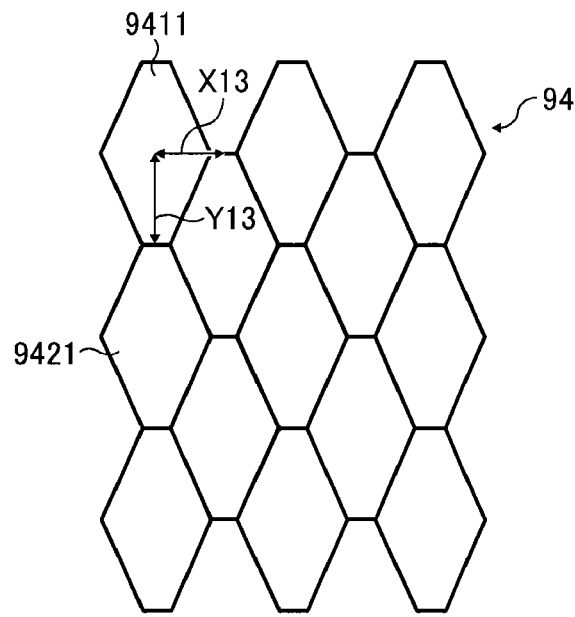
Figure 5E:
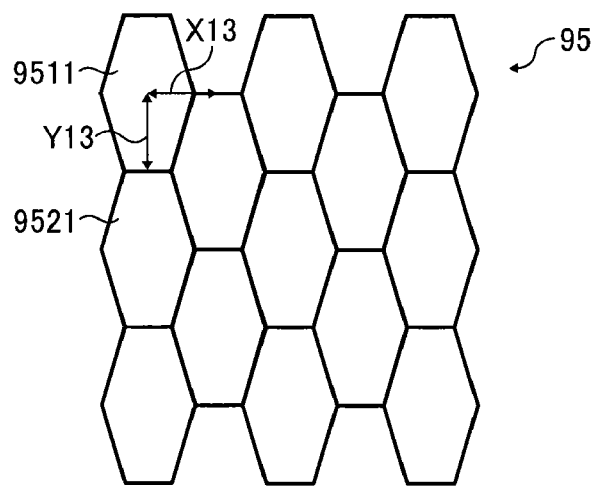

In the honeycomb-type arrays illustrated in FIGS. 5B, 5D, and 5E, all the aspect ratios "Y12/X12" and "Y13/X13" are larger than 1.

In the "micro-convex lens" of any one of the five examples of the micro-convex lens structures illustrated in FIGS. 5A to 5E, the Y-directional length is larger than the X-directional length.

In this manner, in the case of "the micro-convex lens having a shape where the Y-directional length is larger than the X-directional length", as the shape of the micro-convex lens, the X-directional curvature is easily set to be larger than the Y-directional curvature.

Therefore, the above-described "anamorphic optical function where the X-directional power is larger than the Y-directional power" can be easily implemented.

For example, in the case of the example illustrated in FIG. 5A, as a specific example, there is an example where X11=150 μm, Y11=200 μm, and aspect ratio=200/150=4/3>1.

Of course, in this case, the X-directional beam diameter of the pixel-display beam is set to be less than 150 μm, and Y-directional beam diameter is set to be less than 200 μm.

Any one of the arrays of micro-convex lenses illustrated in FIGS. 5B to 5D is a honeycomb-type array, and each micro-convex lens has a "Y-directionally elongated shape".

The array of FIG. 5B is a "zigzag-type", and any one of the arrays of FIGS. 5C to 5E is an "armchair-type".

Of course, any one of the "zigzag-type vertically-elongated honeycomb-type array" of FIG. 5B and the "armchair-type vertically-elongated honeycomb-type array" of FIG. 5C can be available.

However, the array example of FIG. 5C has the following advantages in comparison with the array example of FIG. 5B.

Namely, in comparison with the array of FIG. 5B, in the array of FIG. 5C, a "difference between the X-directional and Y-directional sizes" of the micro-convex lens is small, and a "difference between the effective pixel sizes" in the lateral and vertical directions is small.

Specific numeric values are listed.

For example, in FIG. 5B, with respect to the micro-convex lenses 9211, 9212, and the like, the X-directional lens diameter is set to be R2$x$=100 μm, and the Y-directional lens diameter is set to be R2$y$=200 μm.

At this time, the X-directional effective pixel pitch (=X12) becomes 50 μm, and the Y-directional effective pixel pitch (=Y12) becomes 150 μm.

Similarly, in FIG. 5C, with respect to the micro-convex lenses 9311, 9312, and the like, the X-directional lens diameter is set to be R3$x$=100 μm, and the Y-directional lens diameter is set to be R3$y$=200 μm.

In addition, the lengths of the upper and lower sides of the hexagon shapes of the micro-convex lenses 9311 and the like are set to be 50 μm.

At this time, the X-directional effective pixel pitch (=X13) becomes 75 μm, and the Y-directional effective pixel pitch (=Y13) becomes 100 μm.

Therefore, the "X-directional and Y-directional effective pixel pitches" of the case of the array (75 μm and 100 μm) of FIG. 5C become "closer values" that those of the case of the array (50 μm and 100 μm) of FIG. 5B.

In FIGS. 5C, 5D, and 5E, the X-directional effective pixel pitch is denoted by X13, and the Y-directional effective pixel pitch is denoted by Y13.

This is in accordance with the fact that, in the honeycomb-type arrays (armchair-type honeycomb-type arrays) of FIGS. 5C to 5E, the X-directional pixel pitch and the Y-directional pixel pitch are defined to be equal to each other.

In FIG. 5D, with respect to micro-convex lenses 9411, 9421, and the like, the upper and lower sides parallel to the X direction are short, and the inclined sides are long.

In addition, in FIG. 5E, with respect to micro-convex lenses 9511, 9521, and the like, the upper and lower sides parallel to the X direction are short, and the inclined sides are long.

As illustrated in the figures, by deformation of the hexagon shape of the micro-convex lens, the X-directional pixel pitch X13 and the Y-directional pixel pitch Y13 can be adjusted.

Similarly to the case of FIG. 5C, in the arrays of FIGS. 5D and 5E, "the micro-convex lens structures are vertically-elongated structures" and "the X-directional and Y-directional effective pixel pitches can be equalized".

Figure 8:
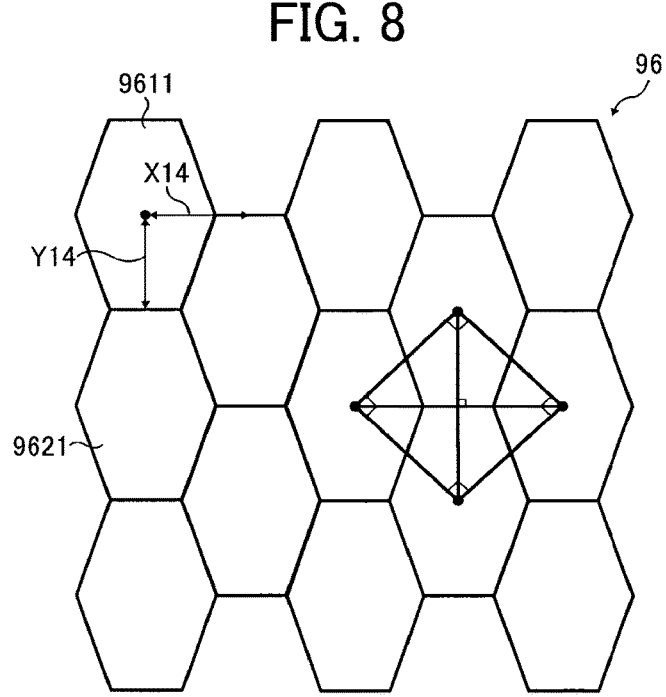
FIG. 8 is an exemplary diagram illustrating another example of array form of micro-convex lenses according to an embodiment of the present invention.

For example, micro-lenses 9611, 9621, and the like of the micro-lens array 96 illustrated in FIG. 8 have vertically-elongated hexagon shapes similarly to the micro-lens array 95 illustrated in FIG. 5D.

The array of the micro-lenses 9611 and the like illustrated in FIG. 8 is an "armchair-type vertically-elongated honeycomb-type array" similarly to the FIG. 5C.

The hexagon shape of the micro-lenses 9611 and the like is set so that the X-directional effective pixel pitch X14 and the Y-directional effective pixel pitch Y14 are completely equal to each other.

In this manner, in the armchair-type vertically-elongated honeycomb-type array, the aspect ratio can be set to be 1. In the case of the micro-convex of which size is larger than the beam diameter of the pixel-display beam or the case of the micro-convex lens of which size is substantially equal to the beam diameter of the pixel-display beam, if the aspect ratio of the effective pixel pitches is 1, with respect to the image data projected as the virtual image, reproducibility by the virtual image is increased. This is because the pixel pitch on the micro-lens array of the image data projected as the virtual image and the effective pixel pitch can be equal to each other or because, in comparison with other effective pixel pitches, the effective pixel pitch can be approximate to the pixel pitch of the image data on the micro-lens array of the image data projected as the virtual image.

Heretofore, although the vertical direction is described as the "up/down direction" and the lateral direction is described as the "left/right direction", this is defined for embodying the description.

In an actual space, which direction the vertical direction is determined according to the installation direction of the micro-lens array in the image display device and the installation direction of the image display device in the mobile body such as a car.

While performing one reciprocating oscillating (first-axis oscillating) with respect to the one axis, the two-dimensional deflector 6 performs several times of reciprocating oscillating (second-axis oscillating) with respect to the other axis. However, in many cases, the X direction which is the long direction of the magnified virtual image is set to the scan direction of the pixel-display beam LC for the micro-lens array by the second-axis oscillating. Therefore, the upper and lower sides parallel to the X direction of the "armchair-type" hexagon-shaped micro-lens become substantially parallel to the scan direction of the pixel-display beam LC for the micro-lens array, and the shape obtained by stretching the interval between the two sides most likely parallel to the scan direction of the "armchair-type" hexagon-shaped pixel-display beam for the micro-lens array, in other words, the interval between the side most likely parallel to the scan direction of the pixel-display beam for the micro-lens array and the opposite side so that the interval is enlarged in the direction perpendicular to the two sides is the "armchair-type vertically-elongated honeycomb-type structure".

Therefore, in the armchair-type vertically-elongated honeycomb-type array, in addition to improving the brightness and increasing the number of effective pixels, a difference between the X-direction (lateral-directional) and Y-directional (vertical-directional) effective pixel pitches can be reduced.

As illustrated in FIGS. 5C to 5E, the "shape of the micro-convex lens" can be arbitrarily selected, for example, for controlling the divergent angle of the diverging beam flux.

In the head-up display device illustrated in FIG. 1A, the pixel-display beam LC is perpendicularly incident on the micro-convex lens structure of the scanning-target surface element 8.

However, the form of the incidence of the pixel-display beam on the scanning-target surface element is not limited to the "perpendicular incidence".

Figure 7A:
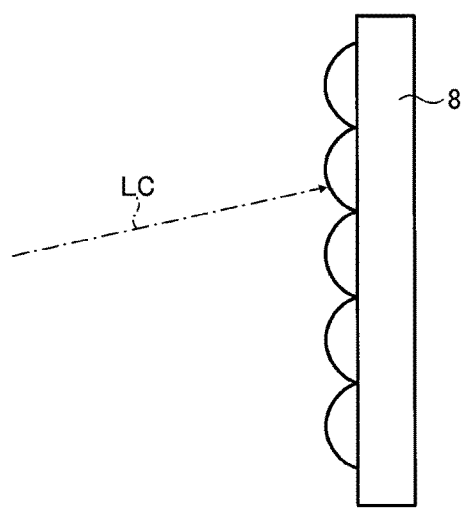
FIGS. 7A and 7B are diagrams for explaining two examples of a scanning-target surface element according to an embodiment of the present invention.

For example, in the case of miniaturizing the head-up display device by studying arrangement of optical elements ranging from the light source unit to the reflecting plane member, an incidence form as illustrated in FIG. 7A is considered.

Namely, in an example of FIG. 7A, the pixel-display beam LC is incident to be inclined with respect to the scanning-target surface element 8.

In a case where the lens surface of the micro-convex lens is set to be an "aspherical surface", the pixel-display beam LC is incident to be inclined with respect to the optical axis of the aspherical surface, and thus, in some cases, the function of the aspherical surface cannot be implemented.

Figure 7B:
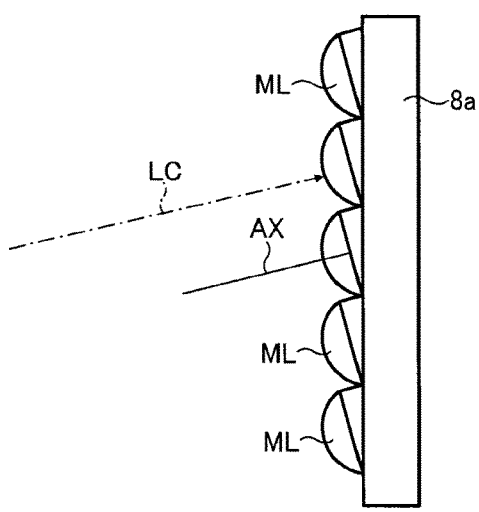

In this case, similarly to a scanning-target surface element 8a of FIG. 7B, it is preferable that a lens surface optical axis AX of the micro-convex lens ML is set to be inclined from the perpendicular direction with respect to a reference surface of the scanning-target surface element 8a.

By doing so, the lens surface optical axis AX can be allowed to be parallel to the incidence direction of the pixel-display beam LC or to be close to the incidence direction.

In addition, the reference surface of the scanning-target surface element 8a is a surface of an array where the micro-convex lenses ML are arranged.

By doing so, the miniaturization of the optical system or the improvement of the light utilization efficiency can be achieved, so that the "divergence direction of the pixel-display beam by the micro-convex lens" can be allowed to be uniform.

The above-described head-up display device is not limited to being mounted on the above-described car, but the head-up display device can be mounted on various types of steerable mobile bodies such as a train, a ship, a helicopter, or an airplane. For example, a windshield (windbreak) of a motor cycle can be configured as a transmitting and reflecting member.

In this case, a windshield in front of a cockpit may be configured as a reflecting plane member.

Of course, the head-up display device can be implemented as, for example, an "image display device for movie viewing".

Although the micro-convex lens of the micro-convex lens structure diffuses the pixel-display beam as described above, the case of performing the diffusion in only one direction of the two X and Y directions can be considered.

In this case, as the lens surface of the micro-convex lens, "micro-convex cylindrical surface" can be used.

In addition, the configuration where the shape of the micro-convex lens is a hexagon shape or the configuration where the micro-convex lenses are arranged in a honeycomb-type array are known in the related art with respect to a manufacturing method for a micro-lens array.

The above-described head-up display device can be used, for example, to be mounted on a car or the like, and thus, the X direction is the "lateral direction as viewed from the driver's seat", and the Y direction is the "vertical direction". The reflecting plane member 10 of this case is a windshield of the car.

In this case, for example, a "navigation image" can be displayed as the magnified virtual image 12 in front of the windshield, and thus, a driver as the observer 11 can observe the image almost without moving the line of sight from the front of the windshield while existing in the driver's seat.

In this case, as described above, in general, it is preferable that the displayed magnified virtual image is an "horizontally-elongated image as viewed from the driver", namely, that the image formed in the micro-lens and the magnified virtual image are an image having an angle of view large in the X direction, that is, a horizontally-elongated image.

From the related art, it is known that the lens surface of the micro-convex lens (micro-lens) can be formed as an "aspherical surface".

The lens surface of the micro-convex lens can be formed as a more general aspherical surface, so that aberration correction can be performed.

Due to the aberration correction, "intensity unevenness of the diffusion" can be reduced.

Figure 9:
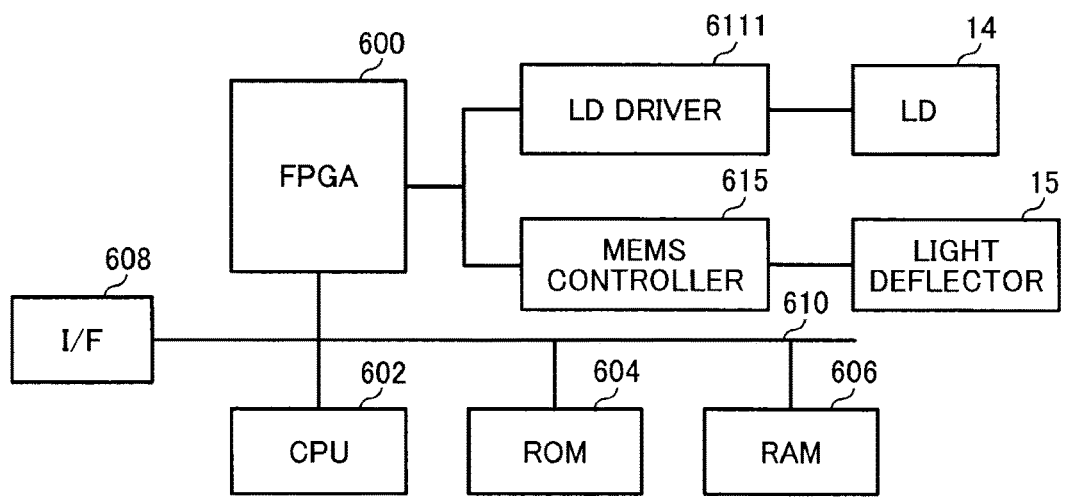
FIG. 9 is a block diagram illustrating a hardware configuration of an image display device according to an embodiment of the present invention.

FIG. 9 is a hardware configuration diagram of the image display device 1000. As illustrated in FIG. 9, the image display device 1000 includes an FPGA 600, a CPU 602, a ROM 604, a RAM 606, an I/F 608, a bus line 610, an LD driver 6111, and a MEMS controller 615. The FPGA 600 allows the LD driver 6111 or the MEMS controller 615 to operate an LD (semiconductor laser) 14 of the light source unit 100 and a later-described light deflector 15. The CPU 602 controls functions of the image display device 1000. The ROM 604 stores an image processing program which is to be executed by the CPU 602 in order to control the functions of the image display device 1000. The RAM 606 is used as a work area of the CPU 602. The I/F 608 is an interface for communicating with an external controller and the like and can be connected to, for example, a controller area network (CAN) or the like of the car.

Figure 10:
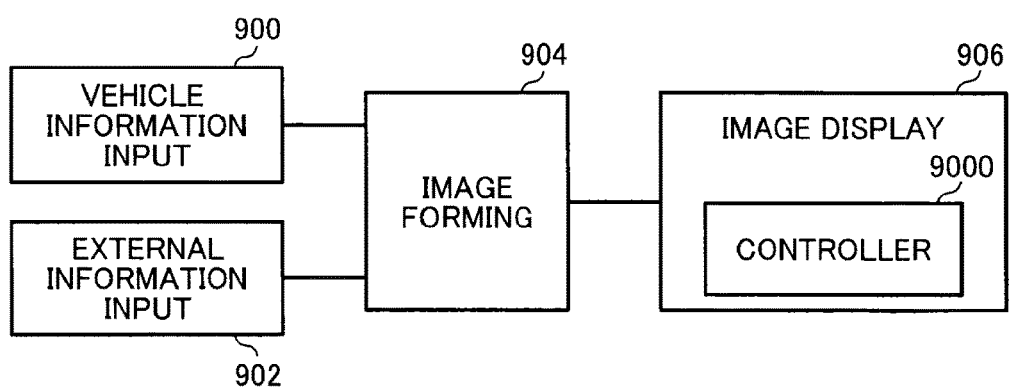
FIG. 10 is a functional block diagram illustrating the image display device according to an embodiment of the present invention.

FIG. 10 is a functional block diagram of the image display device 1000. As illustrated in FIG. 10, the image display device 1000 includes a vehicle (car) information input 900, an external information input 902, an image forming unit (image forming) 904, and an image display 906. The vehicle information (information of speed, travel distance, and the like) is input from the CAN and the like to the vehicle information input 900. The outside-car information (navigation information from GPS, and the like) is input from an external network to the external information input 902. The image forming unit 904 includes the CPU 602, the ROM 604, and the RAM 606 (FIG. 9) and generates an image which is to be displayed based on information input from the vehicle information input 900 and the external information input 902. The image display 906 includes a controller 9000, which may be implemented by the FPGA 600, the LD driver 6111, and the MEMS controller 615, and further includes the LD 14 and the light deflector 15. The image display 906 irradiates the reflecting plane member 10 with the image light according to the image generated by the image forming unit 904. As a result, the magnified virtual image 12 can be visually noticed from the viewing point of the observer 11.

FIG. 11 is a plan view illustrating a light deflector 15 as an example of the two-dimensional deflector 6. As illustrated in FIGS. 2A and 2B, the light deflector 15 includes a mirror 150 which is an MEMS mirror manufactured in a semiconductor process, has a reflecting surface, and is supported by a first frame 151 so as to be oscillatable about a first axis and a support member which supports the first frame 151 so as to be oscillatable about a second axis perpendicular to the first axis. The support member includes a pair of meandering portions 152 where a plurality of beams are connected to each other so as to be meandered and a second frame 154 which supports the meandering portions. Each meandering portion is configured so that one end thereof is connected to the first frame 151 and the other end thereof is connected to the second frame 154. A plurality of piezoelectric members 156 (for example, PZTs) are individually installed in the plurality of beams of each meandering portion. By applying different voltages to the two piezoelectric members 156 individually installed in the adjacent two beams 152a and 152b of each meandering portion, the adjacent two beams 152a and 152b are bent in different directions, and this is accumulated, so that the mirror 150 is oscillating with a large angle around the second axis. According to this configuration, light scanning (for example, light scanning in a sub-scanning direction) around the second axis can be performed with a low voltage. On the other hand, light scanning (for example, light scanning in a main-scanning direction) is performed around the first axis, due to resonance using a piezoelectric actuator or the like including, for example, a torsion bar connected to the mirror 150, and a cantilever and a piezoelectric member (for example, PZT) connected between the torsion bar and the first frame 151. In addition, the light reflector 15 includes a detector which detects oscillating positions around the first and second axes of the mirror 150, so that detection information of the detector is output to a processing device 50. The processing device 50 drives and controls the semiconductor laser based on the detection information and the image information.

In recent years, much expectation in the market has been increasing with respect to applications where warning and information can be visually noticed by the driver performing slight movement of the line of sight, and development of technique of an HUD (head-up display) mounted on a car has been proceeding. In particular, with the progress of an on-vehicle sensing technique represented by an advanced driving assistance system (ADAS), a car can acquire various types of travel environment information and information on in-car persons, and as an "outlet of the ADAS" delivering the information to the driver, the HUD has drawn much attention.

As a projection type of the HUD, there are a "panel type" where an intermediate image is displayed by an imaging device such as a liquid crystal or a DMD and a "laser scan type" where an intermediate image is formed by scanning a laser beam emitted from a laser diode by a two-dimensional scanning device. In particular, in the latter laser scan type, unlike the panel type where the image is formed by partial light blocking over the entire screen emission, since emitting/non-emitting can be assigned to each pixel, in general, a high-contrast image can be formed.

Requirements for the HUD in the mark are concentrated on the following two points. 1. Compactness 2. Low Stress of Visibility With respect to the "compactness", required is a size of not interfering with a duct, meters, a defroster, a car body structure, and the like accommodated in a dash board as much as possible. This is because, if the duct, the meters, the defroster, and the car body structure are retracted in order to mount the HUD, air-conditioner performance, defroster performance, and car body strength performance are degraded.

With respect to the "low stress of visibility", since an image of the HUD is configured so that information is always displayed in the vicinity of the view field of the driver, image representation without stress by a driving environment and a driver state is required. The development of the ADAS technique leads to an increasing in an amount of contents projected on the HUD. Since there is a limitation in a human recognition process, the increasing sensing information itself is displayed on the HUD, the driver feels troublesome, and in turn, the HUD as an information display device becomes a cause of impeding view field for driving.

In the HUD described heretofore, that is, the head-up display, the image light formed by the image forming unit including the light source and the image forming elements is projected on the screen (for example, a scanning-target surface element), and after that, the image light is projected, by the projection optical system including the concave mirror. Next, the image light passes through the transmitting and reflecting member (for example, a windshield or a combiner) to be incident on the human eye (can be visually noticed through the transmitting and reflecting member). The screen is configured with, for example, the micro-lens array, and the divergent angle of the light is arbitrarily controlled according to the lens curvature. At this time, the X-directional and Y-directional pixel pitches of the display image (virtual image) are determined by the magnification ratios of the observation optical system including the projection optical system and the windshield and the X-directional and Y-directional effective lens pitches of the micro-lens array.

However, in the head-up display device (for example, refer to Patent Document 1) of the related art, in a case where the image light is guided to the human eye by the observation optical system through the micro-lens array, the difference between the X-directional and Y-directional (horizontal and vertical) pixel pitches of the display image (virtual image) is increased.

In the state that the difference between the horizontal and vertical pixel pitches of the display image is large, the reproducibility of the pixels is degraded, and the overall image quality of the image is degraded.

Namely, in the head-up display device of the related art, in design of the micro-lens array, it is not considered at all that the difference between the X-directional and Y-directional pixel pitches of the display image is set to be small, and as a result, the image quality is degraded.

The degradation of the image quality is remarkable as the magnification ratio of the observation optical system is increased. For example, since the miniaturization of the device is intended to be achieved while the size of the display image is maintained, if the length of the optical path from the screen to the projection optical system is shortened and the projection optical system is configured as a high-magnification-ratio optical system, the degradation of the image quality is remarkable.

Therefore, in order to achieve the miniaturization of the device while suppressing degradation in image quality, the invertors developed a head-up display device (hereinafter, sometimes referred as an "HUD") as the image display device described below. The general arrangement of the HUD is the same as that of the image display device 1000 (head-up display device). In the HUD, all the above-described configurations of the image display device 1000 can be employed.

Figure 12A:
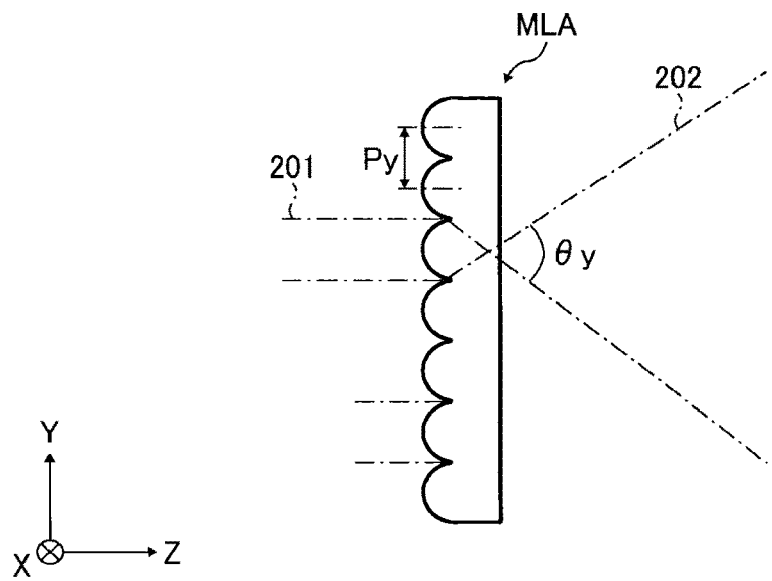
FIGS. 12A and 12B are diagrams for explaining micro-lens arrays (MLAs) of HUD according to an embodiment of the present invention.
Figure 12B:
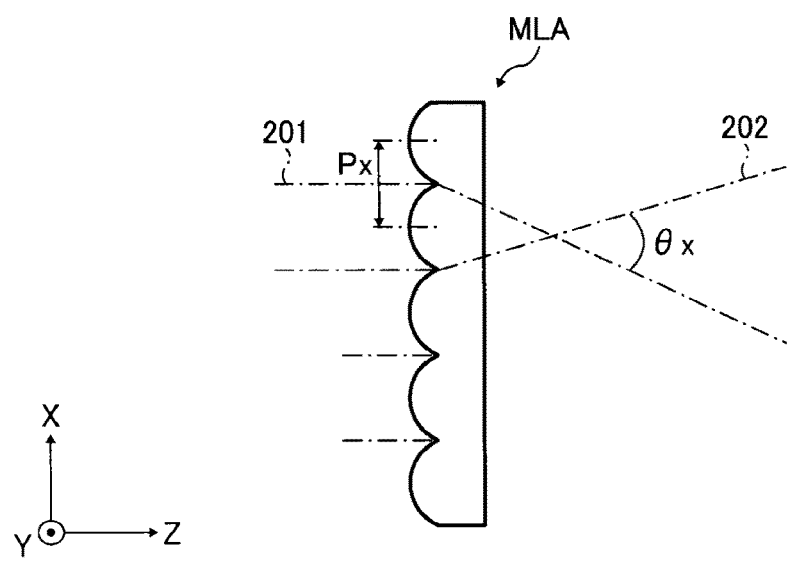

The HUD includes a micro-lens array (hereinafter, sometimes referred to as an "MLA") disposed to be parallel to the XY plane as illustrated in FIGS. 12A, 12B, and 13.

The MLA has a structure where a plurality of micro-lenses are arranged in a matrix shape (two-dimensional lattice shape) without gap and allows a laser beam from the light source unit 100 to diverge at a desired divergent angle. The micro-lens is a lens of which horizontal width is, for example, about 200 μm. In addition, the plane shape (shape viewed from the Z direction) of the micro-lens is not limited to a quadrilateral shape, but a hexagon shape or a triangle shape may also be employed.

In FIGS. 12A and 13, "Py" denotes the Y-directional lens pitch. In FIGS. 12B and 13, "Px" denotes the X-directional lens pitch. In addition, in the MLA, the geometrical center and the optical center of each micro-lens are coincident with each other. In addition, the "geometrical center of the micro-lens" denotes the geometrical center of the micro-lens when the micro-lens is viewed from the Z direction. The "optical center of the micro-lens" denotes the "position of the optical axis of the micro-lens" or the "position where the intensity distribution of the transmitting light of the micro-lens is at maximum".

As illustrated in FIGS. 12A and 12B, when the MLA is scanned with an incident beam flux 201, the incident beam flux 201 is allowed to diverge by the micro-lens to be a diverging beam 202. By independently controlling the X-directional and Y-directional lens pitches Px and Py of the MLA, the incident beam flux 201 can be allowed to diverge at desired divergent angles θx and θy.

Herein, the number of pixels of the intermediate image of the HUD is determined by the number of lenses of the MLA. In FIG. 13, a size of a rectangle having Y-directional and X-directional distances Py and Px between centers of adjacent two micro-lenses as vertical and horizontal lengths can be regarded as a size of one pixel in a micro-lens. Herein, the number of Y-directional lenses is larger than the number of X-directional lenses, and Px>Py is set. On the other hand, with respect to the X-directional and Y-directional magnification ratios Bx and By of the observation optical system, Bx<By is set.

Namely, in the HUD, Bx<By and Px>Py . . . (1) is satisfied.

Therefore, in the HUD, since the beam flux 202 allowed to diverge by the MLA having the X-directional and Y-directional lens pitches Px and Py is enlarged according to the X-directional and Y-directional magnification ratios Bx and By of the observation optical system, the difference between the X-directional and Y-directional pixel pitches (pixel densities) of the display image can be reduced, so that it is possible to suppress degradation in image quality.

In addition, similarly, in terms that the difference between the X-directional and Y-directional pixel pitches of the display image is set to be reduced, Bx>By and Px<Py . . . (2) is favorably satisfied.

In a case where the aforementioned Formula (1) or (2) is satisfied, it is more preferable that Px×Bx≈Py×By . . . (3) is satisfied. In this case, the difference between the X-directional and Y-directional pixel pitches of the display image can be greatly reduced (substantially zero), so that it is possible to further suppress degradation in image quality.

For example, if it is set that (Bx, By)=(15.4, 14.2) and (Px, Py)=(130 μm, 140 μm), the values are substantially the same so that 15.4×130≈14.2×140, and the X-directional and Y-directional pixel pitches of the display image are substantially equal to each other. In addition, the term "substantially coincident" mentioned above denotes that the top two digits are the same or, when the top third digit is round off, the top two digits are the same.

In addition, with respect to the settings of Px, Py, Bx, and By, (Bx, By) may be set and (Px, Py) may be set according to the value; (Px, Py) may be set and (Bx, By) may be set according to the value; (Px, Bx) may be set and (Py, By) may be set according to the value; and (Py, By) may be set and (Px, Bx) may be set according to the value.

However, in terms of design of the HUD, it is considered to be reasonable that the magnification ratios (Bx, By) of the observation optical system having greater influence on the overall structure are set and, after that, the lens pitches (Px, Py) of the MLA are set.

As an example, the virtual image displayed by the HUD is set so that the horizontal angle of view is 8°, the vertical angle of view is 3°, and the virtual image display distance is 6 m from the position of the viewing point. At this time, the size of the virtual image is obtained so that X is 838 mm and Y is 314 mm. In addition, the horizontal width of the intermediate image is 57 mm, and the vertical width thereof is 24 mm. As a result, the magnification ratios of the observation optical system which are the ratios of the sizes between the virtual image and the intermediate image becomes (Bx, By)=(14.7, 13.1). The reason why the ratios are different between the X direction and the Y direction as described above is that the observation optical system including the projection optical system and the windshield are eccentric optical systems which are rotationally asymmetric. In addition, since the projection optical system is configured as a high-magnification-ratio optical system in order to achieve the miniaturization of the HUD, the influence due to the difference in the magnification ratio is further increased. In a case where (Bx, By)=(14.7, 13.1), in the MLA where the X-directional and Y-directional pixel pitches of the display image (virtual image) are substantially the same, the X-directional and Y-directional lens pitches (Px, Py) become (130 μm, 140 μm).

The MLA is not limited to the above-described matrix-shaped array, but for example, a honeycomb-shaped array using a plurality of hexagon-shaped micro-lenses which are substantially the same may also be employed. The honeycomb-shaped array is mainly classified into two types.

Namely, as the honeycomb-shaped array, there are a "zigzag-type array" having sides parallel to the Y direction as illustrated in FIG. 14A and an "armchair-type array" having sides parallel to the X direction as illustrated in FIG. 14B. Herein, it is assumed that the geometrical center and the optical center of each micro-lens are coincident with each other.

In FIG. 14A, the distance between the centers of the two micro-lenses adjacent to each other in the X direction can be regarded as an X-directional lens pitch Px, and the adjacent interval between the adjacent axes (center axes) passing through centers of the plurality of micro-lenses arranged in the X direction can be regarded as a Y-directional lens pitch Py. In this case, X-directional resolution is improved.

In FIG. 14B, the distance between the centers of the two micro-lenses adjacent to each other in the Y direction can be regarded as a Y-directional lens pitch Py, and the adjacent interval between the adjacent axes (center axes) passing through centers of the plurality of micro-lenses arranged in the Y direction can be regarded as an X-directional lens pitch Px. In this case, Y-directional resolution is improved.

In the MLA as the honeycomb-shaped array as described above, in a case where the aforementioned Formula (1) or (2) is satisfied, the difference between the X-directional and Y-directional pixel pitches (pixel densities) of the display image can be reduced, so that it is possible to suppress degradation in image quality. Furthermore, in a case where the aforementioned Formula (3) is satisfied, it is possible to further suppress degradation in image quality.

Figure 15:
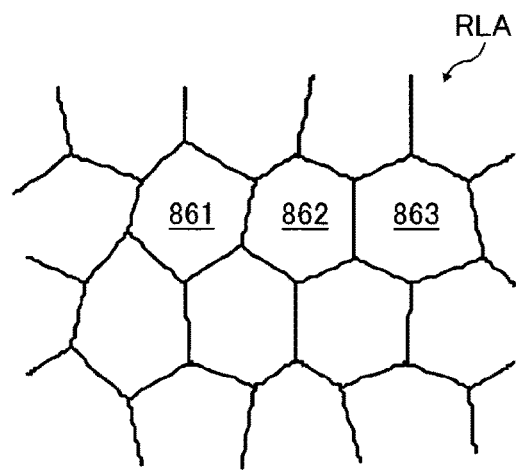
FIG. 15 is a diagram for explaining random array of micro-lenses according to an embodiment of the present invention.

In addition, the lens array of the MLA may be configured as a random array having no periodicity (regularity) as illustrated in FIG. 15 for the reason of degradation of the image quality such as speckle. By configuring as the random array, with respect to interference patterns generated between lens elements 861 and 862 and between the lens elements 862 and 863, since interference fringes having different orientations and pitches are generated, the interference pattern cannot be visually noticed as interference fringes having an orientation and a pitch macroscopically.

As measures for reducing the periodicity of the lenses, the randomization of lens boundary directions due to non-periodicity (irregularity) of the lens pitches will be described. In addition, a structure relating to the randomization is disclosed in, for example, JP-2003-004907-A.

A micro-lens array (hereinafter, sometimes referred to as a "random-arranged lens array RLA") where the lens boundary directions are randomized is different from a general random diffusion plate.

In the case of the general diffusion plate, uneven structures having different diameters are formed on the surface thereof. Therefore, for example, if extremely small uneven portions smaller than the beam diameter exist, strong interference occurs in the portions. Therefore, interference occurs in the general diffusion plate.

In order to suppress such interference, in the random-arranged lens array RLA, while the lens diameters are maintained to be a certain value or more over the entire surface, a portion of the structures is randomized.

Figure 16:
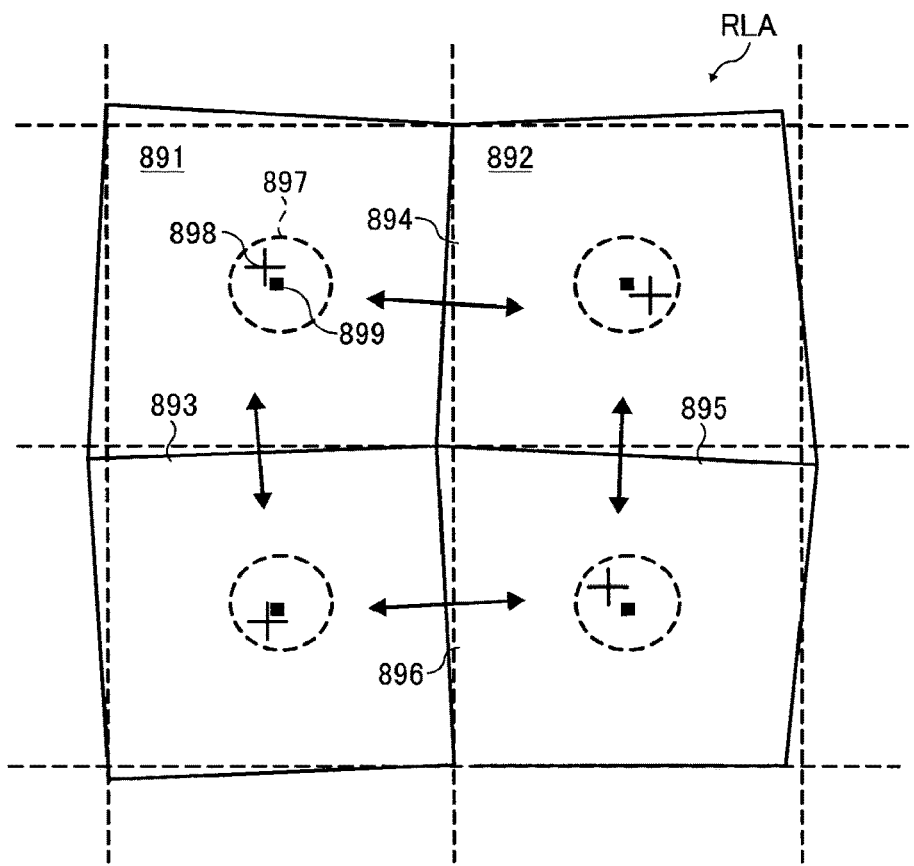
FIG. 16 is a diagram for explaining dispersion of lens boundary directions according to an embodiment of the present invention.

More specifically, as illustrated in FIG. 16, for example, in the random-arranged lens array having substantially square-shaped micro-lenses, the lens diameters are set so that incident beam flux diameter<lens diameter as described above.

In addition, an optical center 898 of each lens is arranged to be randomly displaced for each lens within a virtual boundary area indicated by 897 with respect to a periodic reference pattern (geometrical center) indicated by 899. This manipulation can be applied to all the other lenses, so that the micro-lens array where the positions of the optical centers of the lenses in each lens area are different can be implemented. By doing so, with respect to the lens boundary used as a reference, a lens shape where the boundary directions are randomly shifted as illustrated by lines 893, 894, 895, and 896 can be implemented. By applying this randomization to all the other lenses, a random-arranged lens array RLA where the boundary directions of the lenses are different can be implemented.

Figure 17A:
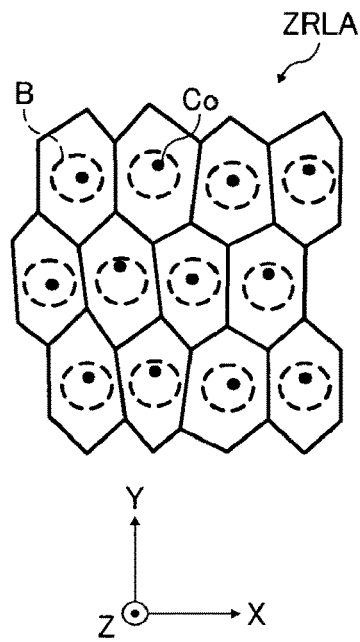
FIGS. 17A and 17B are diagrams for explaining random-arranged lens arrays ZRLA and ARLA where lens boundary directions are dispersed according to an embodiment of the present invention.
Figure 17B:
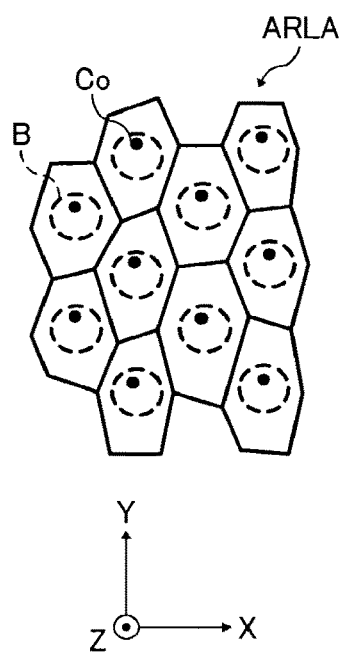

FIGS. 17A and 17B illustrate specific examples of the random-arranged lens array RLA. FIG. 17A illustrates a hexagon-shaped zigzag-type random-arranged lens array ZRLA, and FIG. 17B illustrates a hexagon-shaped armchair-type random-arranged lens array ARLA.

Herein, with respect to the ZRLA, an average value of X-directional distances between optical centers of two micro-lenses adjacent to each other in the X direction is set as an X-directional lens pitch, and an average value of adjacent intervals between adjacent axes passing through Y-directional average positions of optical centers of the plurality of micro-lenses arranged in the X direction and extending in the X direction is set as a Y-directional lens pitch.

In addition, with respect to the ARLA, an average value of Y-directional distances between optical centers of two micro-lenses adjacent to each other in the Y direction is set as a Y-directional lens pitch, and an average value of adjacent intervals between adjacent axes passing through X-directional average positions of optical centers of the plurality of micro-lenses arranged in the Y direction and extending in the Y direction is set as an X-directional lens pitch.

In the cases of the ZRLA and the ARLA, as described above, the horizontal angle of view of the virtual image is set to 8°, and the vertical angle of view thereof is set to 3°. The virtual image display distance is 6 m from the position of the viewing point, and at this time, the size of the virtual image is set so that the X-directional width is 839 mm and the Y-directional width is 314 mm. In addition, the virtual boundary area (refer to reference numeral 897 in FIG. 16) where the randomization of the optical center (refer to reference numeral 898 in FIG. 16) is performed is set as a circle having a pitch ratio (ratio to the lens pitch) of about 6% and a radius of 8 μm and using the geometrical center (refer to reference numeral 899 in FIG. 16) as a center. Since the horizontal width of the intermediate image is 57 mm and the vertical width thereof is 24 mm, the X-directional and Y-directional magnification ratios of the observation optical system as ratios of sizes of the virtual image and the intermediate image become 14.7 times and 13.1 times, respectively. The X-directional and Y-directional magnification ratios are different from each other because the projection optical system and the optical system including the windshield are eccentric optical systems which are rotationally asymmetric. In addition, since the distance from the screen to the projection optical system is shortened and the projection optical system is configured as a high-magnification-ratio optical system in order to achieve the miniaturization of the HUD, the difference in the magnification ratio is further increased. With respect to the magnification ratios of the observation optical system which are 14.7 times in the X direction and 13.1 times in the Y direction, the X-directional and Y-directional lens pitches of the micro-lens array where the pixel pitches of the display image are constant in the X and Y directions are, for example, 130 μm and 140 μm, respectively.

Hereinafter, micro-lens arrays (MLA1 to MLA9) of Examples 1 to 9 of the MLA will be described. In addition, for the convenience, at least a portion of the micro-lens array is illustrated in the figures.

Example 1

In an MLA1 of Example 1, as illustrated in FIG. 18, a plurality of micro-lenses which have a vertically-elongated quadrilateral shape (herein, a vertically-elongated rectangle shape) and are substantially the same are arranged in a matrix shape without gap.

In the MLA1, a geometrical center and an optical center of each micro-lens are coincident with each other, an X-directional lens pitch is P1, and a Y-directional lens pitch is P2. Herein, the geometrical center is indicated by ○, and the optical center is indicated by ● (these indications are the same in other Examples).

In FIG. 18, lens columns having the plurality of micro-lenses arranged in the X direction are called a first lens column, a second lens column, a third lens column, and a fourth lens column in the order of from the +Y side to the −Y side. In this case, the MLA1 includes a lens column group having the first to fourth lens columns. This is the same in Examples 2 to 6.

In each lens column, the axis (central axis) passing through the centers of the plurality of micro-lenses arranged in the X direction are parallel to the X axis, and the interval (adjacent interval between the adjacent central axes) of the two central axes adjacent to each other is constant (P2). Therefore, the adjacent interval between the adjacent central axes can be defined by the Y-directional lens pitch. In addition, the central axes of the first to fourth lens columns are Y1c to Y4c (refer to FIG. 18).

In the MLA1 of Example 1, when it is set that P1=Px and P2=Py, in a case where the aforementioned Formula (1) or (2) is satisfied, it is possible to suppress degradation in image quality, and in a case where the aforementioned Formula (3) is satisfied, it is possible to further suppress degradation in image quality. More specifically, in Example 1, in case of using a vertically-elongated micro-lens, it is obtained that P1<P2. Therefore, in a case where B1>B2 is satisfied, it is possible to suppress degradation in image quality. On the other hand, contrary to Example 1, in case of using a horizontally-elongated micro-lens, since it is obtained that P2<P1. Therefore, in a case where B1<B2 is satisfied, it is possible to suppress degradation in image quality.

Example 2

In an MLA2 of Example 2, as illustrated in FIG. 19, a plurality of micro-lenses which have a vertically-elongated quadrilateral shape (herein, a vertically-elongated rectangle shape) and are substantially the same are arranged in a matrix shape without gap.

In the MLA2, the optical center of each micro-lens is located to be eccentric form (deviated from) the geometrical center. The eccentricity direction and the eccentricity amount are randomized (irregular), and the virtual boundary area defining the eccentricity range is a circle having a radius r1 and using the geometrical center as the center.

Namely, in the MLA2, since the X-directional and Y-directional eccentricity ranges are the same overall and the optical center is randomly located to be eccentric, the averages of the X-directional and Y-directional eccentricity amounts can be regarded to be the same without any problem, and substantially, the MLA can be regarded as the same as the micro-lens array such as the MLA1 of Example 1 where the X-directional and Y-directional lens pitches are P1 and P2.

In the MLA2 of Example 2, when it is set that P1=Px and P2=Py, in a case where the aforementioned Formula (1) or (2) is satisfied, it is possible to suppress degradation in image quality, and in a case where the aforementioned Formula (3) is satisfied, it is possible to further suppress degradation in image quality. More specifically, in Example 2, in case of using a vertically-elongated micro-lens, it is obtained that P1<P2. Therefore, in a case where B1>B2 is satisfied, it is possible to suppress degradation in image quality. On the other hand, contrary to Example 2, in case of using a horizontally-elongated micro-lens, since it is obtained that P2<P1. Therefore, in a case where B1<B2 is satisfied, it is possible to suppress degradation in image quality.

Example 3

Figure 20:
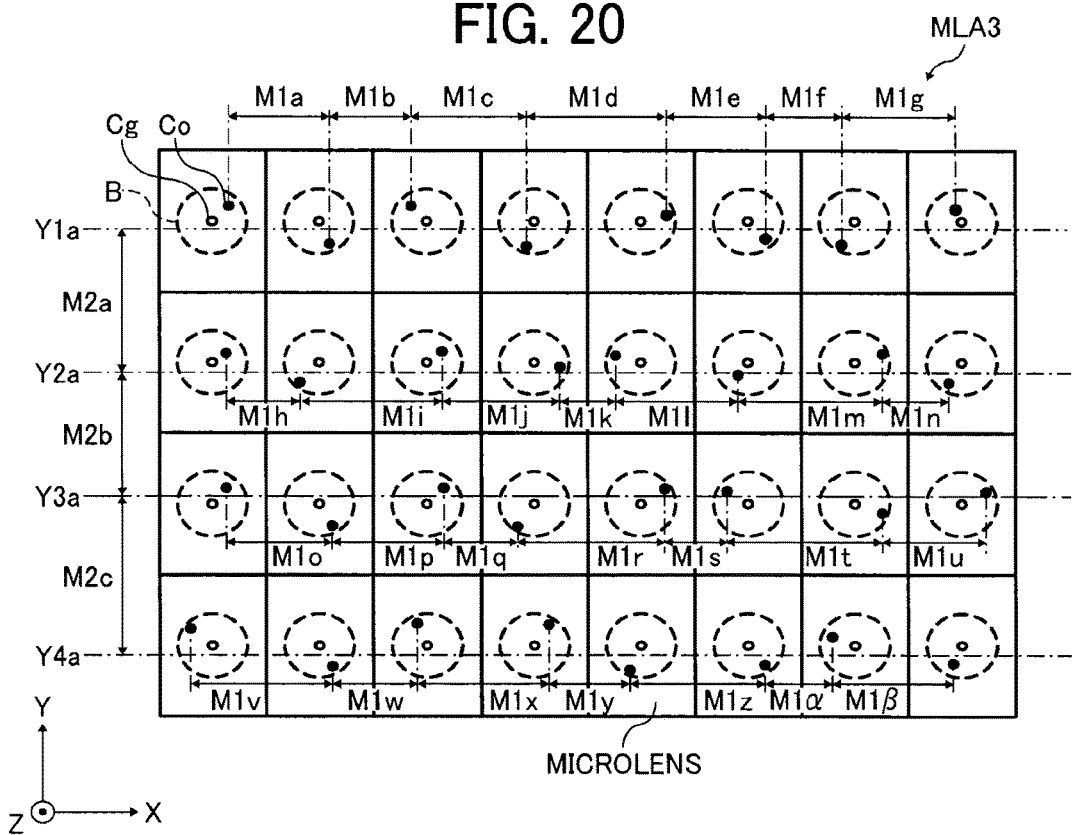
FIG. 20 is a diagram for explaining a micro-lens array (MLA3) of Example 3.

In an MLA3 of Example 3, as illustrated in FIG. 20, similarly to Example 2, a plurality of micro-lenses which have a vertically-elongated quadrilateral shape (herein, a vertically-elongated rectangle shape) and are substantially the same are arranged in a matrix shape without gap, and an optical center of each micro-lens is randomly located to be eccentric.

In the MLA3, when an average value of X-directional distances between the optical centers of two micro-lenses adjacent to each other in the X direction is set as M1, an average value of adjacent intervals between adjacent axes passing through Y-directional average positions of optical centers of the plurality of micro-lenses of each lens column and extending in the X direction is set as M2, and X-directional and Y-directional magnification ratios of an observation optical system are set as B1 and B2, respectively, in a case where M1>M2 and B1<B2 or M1<M2 and B1>B2 is satisfied, it is possible to suppress degradation in image quality, and in a case where M1×B1≈M2×B2 is satisfied, it is possible to further suppress degradation in image quality. More specifically, in Example 3, in case of using a vertically-elongated micro-lens, it is obtained that M1<M2. Therefore, in a case where B1>B2 is satisfied, it is possible to suppress degradation in image quality. On the other hand, contrary to Example 3, in case of using a horizontally-elongated micro-lens, it is obtained that M2<M1. Therefore, in a case where B1<B2 is satisfied, it is possible to suppress degradation in image quality. In addition, when Y coordinates of optical centers of the plurality of micro-lenses of each lens column are denoted by y1, y2, . . . , yN, a Y-directional average position of the optical center of the lens column is (y1+y2+ . . . +yN)/N.

Hereinafter, the M1 and the M2 will be described in detail.

X-directional distances of the optical centers of adjacent two micro-lenses among a plurality (for example, eight) of micro-lenses of the first lens column are M1$a$, M1$b$, M1$c$, M1$d$, M1$e$, M1$f$, and M1$g$.

X-directional distances of the optical centers of adjacent two micro-lenses among a plurality (for example, eight) of micro-lenses of the second lens column are M1$h$, M1$i$, M1$j$, M1$k$, M1$l$, M1$m$, and M1$n$.

X-directional distances of the optical centers of adjacent two micro-lenses among a plurality (for example, eight) of micro-lenses of the third lens column are M1$o$, M1$p$, M1$q$, M1$r$, M1$s$, M1$t$, and M1$u$.

X-directional distances of the optical centers of adjacent two micro-lenses among a plurality (for example, eight) of micro-lenses of the fourth lens column are M1$v$, M1$w$, M1$x$, M1$y$, M1$z$, M1$\alpha$, and M1$\beta$.

Therefore, it is obtained that M1=(M1$a$+M1$b$+M1$c$+M1$d$+M1$e$+M1$f$+M1$g$+M1$h$+M1$i$+M1$j$+M1$k$+M1$l$+M1$m$+M1$n$+M1$o$+M1$p$+M1$q$+M1$r$+M1$s$+M1$t$+M1$u$+M1$v$+M1$w$+M1$x$+M1$y$+M1$z$+M1$\alpha$+M1$\beta$)/28.

When the axes passing through the Y-directional average position of the optical centers of a plurality (for example, eight) of micro-lenses of the first to fourth lens column are denoted by Y1$a$, Y2$a$, Y3$a$, and Y4$a$, the interval between Y1$a$ and Y2$a$ is denoted by M2$a$, the interval between Y2$a$ and Y3$a$ is denoted by M2$b$, and the interval between Y3$a$ and Y4$a$ is denoted by M2$c$, M2=(M2$a$+M2$b$+M2$c$)/3 is obtained.

Example 4

Figure 21:
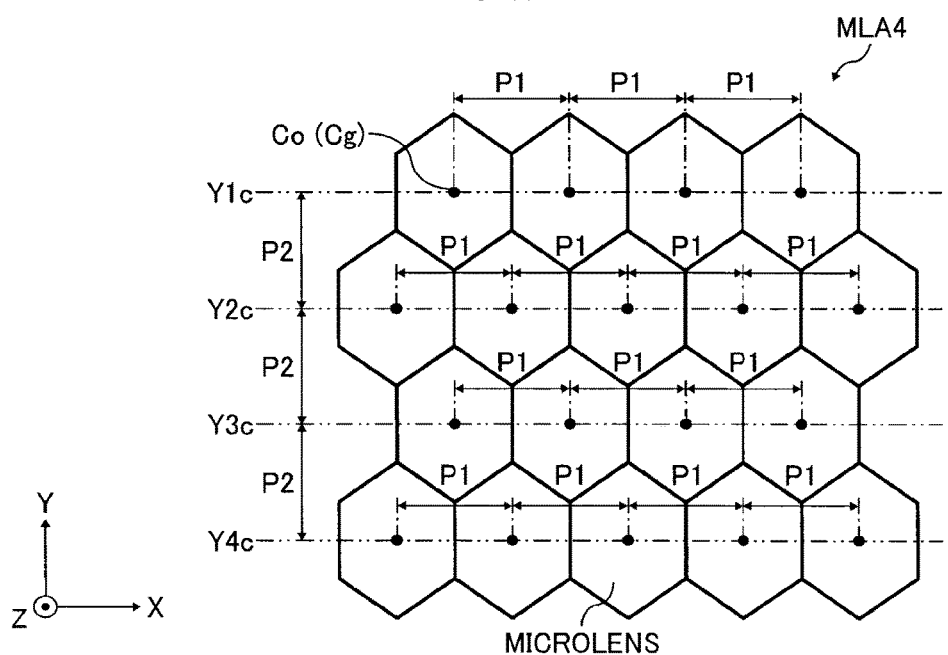
FIG. 21 is a diagram for explaining a micro-lens array (MLA4) of Example 4.

In an MLA4 of Example 4, as illustrated in FIG. 21, a plurality of micro-lenses which have a vertically-elongated hexagon shape and are substantially the same are arranged in a zigzag shape without gap.

In the MLA4, a geometrical center and an optical center of each micro-lens are coincident with each other, an X-directional lens pitch is P1, and a Y-directional lens pitch is P2.

In each lens column, the axis (central axis) passing through the centers of the plurality of micro-lenses arranged in the X direction are parallel to the X axis, and the interval (adjacent interval between the adjacent central axes) of the two central axes adjacent to each other is constant (P2). Therefore, the adjacent interval between the adjacent central axes can be defined by the Y-directional lens pitch. The central axes of the first to fourth lens columns are Y1$c$ to Y4$c$ (refer to FIG. 21).

In the MLA4 of Example 4, when it is set that P1=Px and P2=Py, in a case where the aforementioned Formula (1) or (2) is satisfied, it is possible to suppress degradation in image quality, and in a case where the aforementioned Formula (3) is satisfied, it is possible to further suppress degradation in image quality. More specifically, in Example 4, in case of using a vertically-elongated micro-lens, it is obtained that P1<P2. Therefore, in a case where B1>B2 is satisfied, it is possible to suppress degradation in image quality. On the other hand, contrary to Example 4, in case of using a horizontally-elongated micro-lens, since it is obtained that P2<P1. Therefore, in a case where B1<B2 is satisfied, it is possible to suppress degradation in image quality.

Example 5

Figure 22:
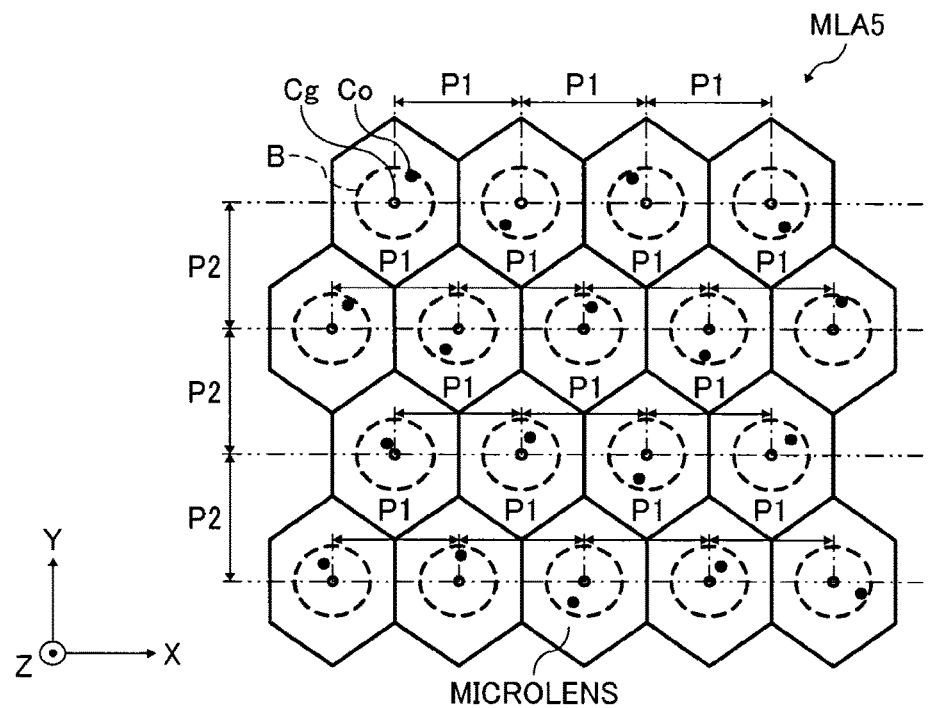
FIG. 22 is a diagram for explaining a micro-lens array (MLA5) of Example 5.

In an MLA5 of Example 5, as illustrated in FIG. 22, a plurality of micro-lenses which have a vertically-elongated hexagon shape and are substantially the same are arranged in a zigzag shape without gap.

In MLA5, the optical center of each micro-lens is located to be eccentric form (deviated from) the geometrical center. In each micro-lens, the eccentricity direction and the eccentricity amount are randomized (irregular), and the virtual boundary area defining the eccentricity range is a circle having a radius r2 and using the geometrical center as the center.

Namely, in the MLA5, since the X-directional and Y-directional eccentricity ranges are the same overall and the optical center is randomly located to be eccentric, the averages of the X-directional and Y-directional eccentricity amounts can be regarded to be the same without any problem, and substantially, the MLA can be regarded as the same as the micro-lens array such as the MLA4 of Example 4 where the X-directional and Y-directional lens pitches are P1 and P2.

In the MLA5 of Example 5, when it is set that P1=Px and P2=Py, in a case where the aforementioned Formula (1) or (2) is satisfied, it is possible to suppress degradation in image quality, and in a case where the aforementioned Formula (3) is satisfied, it is possible to further suppress degradation in image quality. More specifically, in Example 5, in case of using a vertically-elongated micro-lens, it is obtained that P1<P2. Therefore, in a case where B1>B2 is satisfied, it is possible to suppress degradation in image quality. On the other hand, contrary to Example 5, in case of using a horizontally-elongated micro-lens, since it is obtained that P2<P1. Therefore, in a case where B1<B2 is satisfied, it is possible to suppress degradation in image quality.

Example 6

Figure 23:
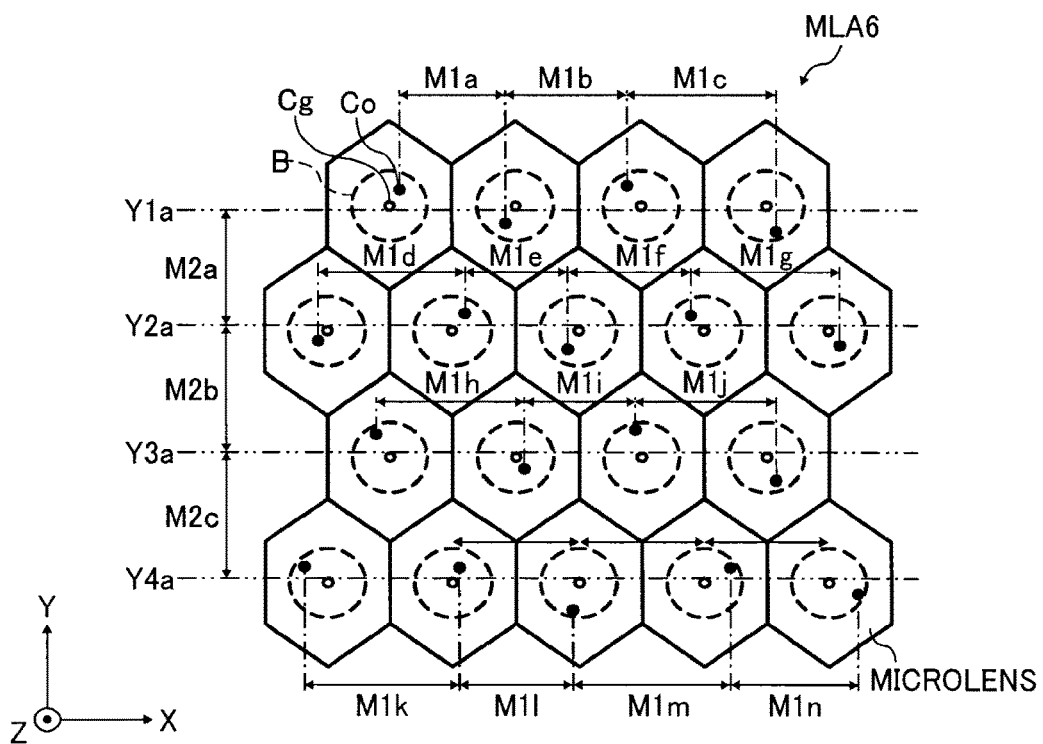
FIG. 23 is a diagram for explaining a micro-lens array (MLA6) of Example 6.

In an MLA6 of Example 6, as illustrated in FIG. 23, similarly to Example 5, a plurality of micro-lenses which have a vertically-elongated hexagon shape and substantially the same are arranged in a zigzag shape without gap, and an optical center of each micro-lens is randomly located to be eccentric.

In the MLA6, when an average value of X-directional distances between the optical centers of two micro-lenses adjacent to each other in the X direction is set as M1, an average value of adjacent intervals between adjacent axes passing through Y-directional average positions of optical centers of the plurality of micro-lenses of each lens column and extending in the X direction is set as M2, and X-directional and Y-directional magnification ratios of an observation optical system are set as B1 and B2, respectively, in a case where M1>M2 and B1<B2 or M1<M2 and B1>B2 is satisfied, it is possible to suppress degradation in image quality, and in a case where M1×B1≈M2×B2 is satisfied, it is possible to further suppress degradation in image quality. More specifically, in Example 6, in case of using a vertically-elongated micro-lens, it is obtained that M1<M2. Therefore, in a case where B1>B2 is satisfied, it is possible to suppress degradation in image quality. On the other hand, contrary to Example 6, in case of using a horizontally-elongated micro-lens, it is obtained that M2<M1. Therefore, in a case where B1<B2 is satisfied, it is possible to suppress degradation in image quality. In addition, when Y coordinates of optical centers of the plurality of micro-lenses of each lens column are denoted by y1, y2, . . . , yN, a Y-directional average position of the optical center of the lens column is (y1+y2+ . . . +yN)/N.

Hereinafter, M1 and M2 will be described in detail.

X-directional distances of the optical centers of adjacent two micro-lenses among a plurality (for example, four) of micro-lenses of the first lens column are M1$a$, M1$b$, and M1$c$.

X-directional distances of the optical centers of adjacent two micro-lenses among a plurality (for example, five) of micro-lenses of the second lens column are M1$d$, M1$e$, M1$f$, and M1$g$.

X-directional distances of the optical centers of adjacent two micro-lenses among a plurality (for example, four) of micro-lenses of the third lens column are M1$h$, M1$i$, and M1$j$.

X-directional distances of the optical centers of adjacent two micro-lenses among a plurality (for example, five) of micro-lenses of the fourth lens column are M1$k$, M1$l$, M1$m$, and M1$n$.

Therefore, it is obtained that M1=(M1$a$+M1$b$+M1$c$+M1$d$+M1$e$+M1$f$+M1$g$+M1$h$+M1$i$+M1$j$+M1$k$+M1$l$+M1$m$+M1$n$)/14.

When the axes passing through the Y-directional average position of the optical centers of a plurality (for example, four or five) of micro-lenses of the first to fourth lens column are denoted by Y1$a$, Y2$a$, Y3$a$, and Y4$a$, the interval between Y1$a$ and Y2$a$ is denoted by M2$a$, the interval between Y2$a$ and Y3$a$ is denoted by M2$b$, the interval between Y3$a$ and Y4$a$ is denoted by M2$c$, M2=(M2$a$+M2$b$+M2$c$)/3 is obtained.

Example 7

Figure 24:
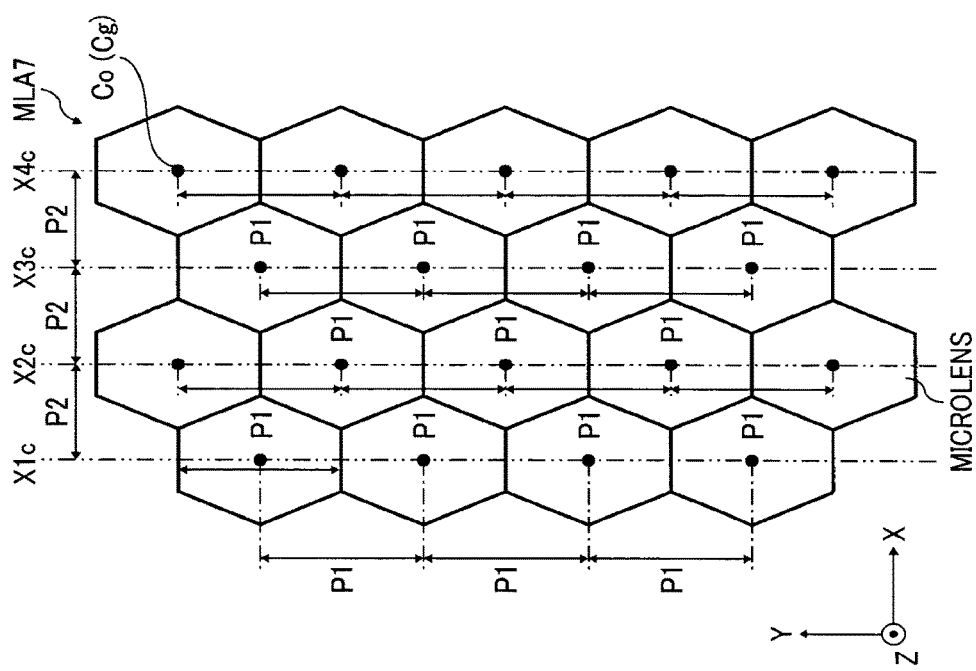
FIG. 24 is a diagram for explaining a micro-lens array (MLA7) of Example 7.

In an MLA7 of Example 7, as illustrated in FIG. 24, a plurality of micro-lenses which have a vertically-elongated hexagon shape and are substantially the same are arranged in an armchair shape without gap.

In the MLA7, a geometrical center and an optical center of each micro-lens are coincident with each other, an X-directional lens pitch is P2, and a Y-directional lens pitch is P1.

In FIG. 24, lens columns configured with the plurality of micro-lenses arranged in the Y direction are called a first lens column, a second lens column, a third lens column, and a fourth lens column in the order of from the −X side to the +X side. In this case, the MLA7 includes a lens column group configured with the first to fourth lens columns.

In each lens column, the axis (central axis) passing through the centers of the plurality of micro-lenses arranged in the Y direction are parallel to the Y axis, and the interval (adjacent interval between the adjacent central axes) of the two central axes adjacent to each other is constant (P2). Therefore, the adjacent interval between the adjacent central axes can be defined by the X-directional lens pitch.

In the MLA7 of Example 7, when it is set that P1=Py and P2=Px and X-directional and Y-directional magnification ratios of an observation optical system are denoted by B1 and B2, respectively, in a case where the aforementioned Formula (1) or (2) is satisfied, it is possible to suppress degradation in image quality, and in a case where the aforementioned Formula (3) is satisfied, it is possible to further suppress degradation in image quality. More specifically, in Example 7, in case of using a vertically-elongated micro-lens, it is obtained that P2<P1. Therefore, in a case where B2>B1 is satisfied, it is possible to suppress degradation in image quality. On the other hand, contrary to Example 7, in case of using a horizontally-elongated micro-lens, since it is obtained that P1<P2. Therefore, in a case where B2<B1 is satisfied, it is possible to suppress degradation in image quality.

Example 8

Figure 25:
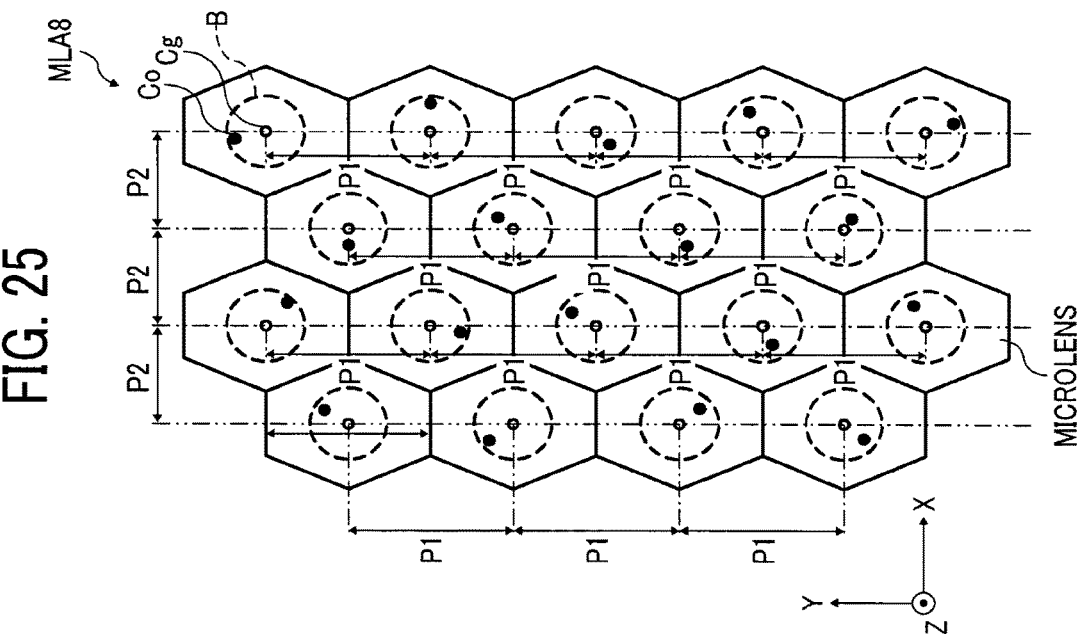
FIG. 25 is a diagram for explaining a micro-lens array (MLA8) of Example 8.

In an MLA8 of Example 8, as illustrated in FIG. 25, a plurality of micro-lenses which have a vertically-elongated hexagon shape and are substantially the same are arranged in an armchair shape without gap.

In the MLA8, the optical center of each micro-lens is located to be eccentric form (deviated from) the geometrical center. The eccentricity direction and the eccentricity amount are randomized (irregular), and the virtual boundary area defining the eccentricity range is a circle having a radius r3 and using the geometrical center as the center.

Namely, in the MLA8, since the X-directional and Y-directional eccentricity ranges are the same overall and the optical center is randomly located to be eccentric, the averages of the X-directional and Y-directional eccentricity amounts are regarded to be the same without any problem, and substantially, the MLA can be regarded as the same as the micro-lens array such as the MLA7 of Example 7 where the X-directional and Y-directional lens pitches are P2 and P1.

In the MLA8 of Example 8, when it is set that P1=Py and P2=Px and X-directional and Y-directional magnification ratios of an observation optical system are denoted by B1 and B2, respectively, in a case where the aforementioned Formula (1) or (2) is satisfied, it is possible to suppress degradation in image quality, and in a case where the aforementioned Formula (3) is satisfied, it is possible to further suppress degradation in image quality. More specifically, in Example 8, in case of using a vertically-elongated micro-lens, it is obtained that P2<P1. Therefore, in a case where B2>B1 is satisfied, it is possible to suppress degradation in image quality. On the other hand, contrary to Example 8, in case of using a horizontally-elongated micro-lens, since it is obtained that P1<P2. Therefore, in a case where B2<B1 is satisfied, it is possible to suppress degradation in image quality.

Example 9

Figure 26:
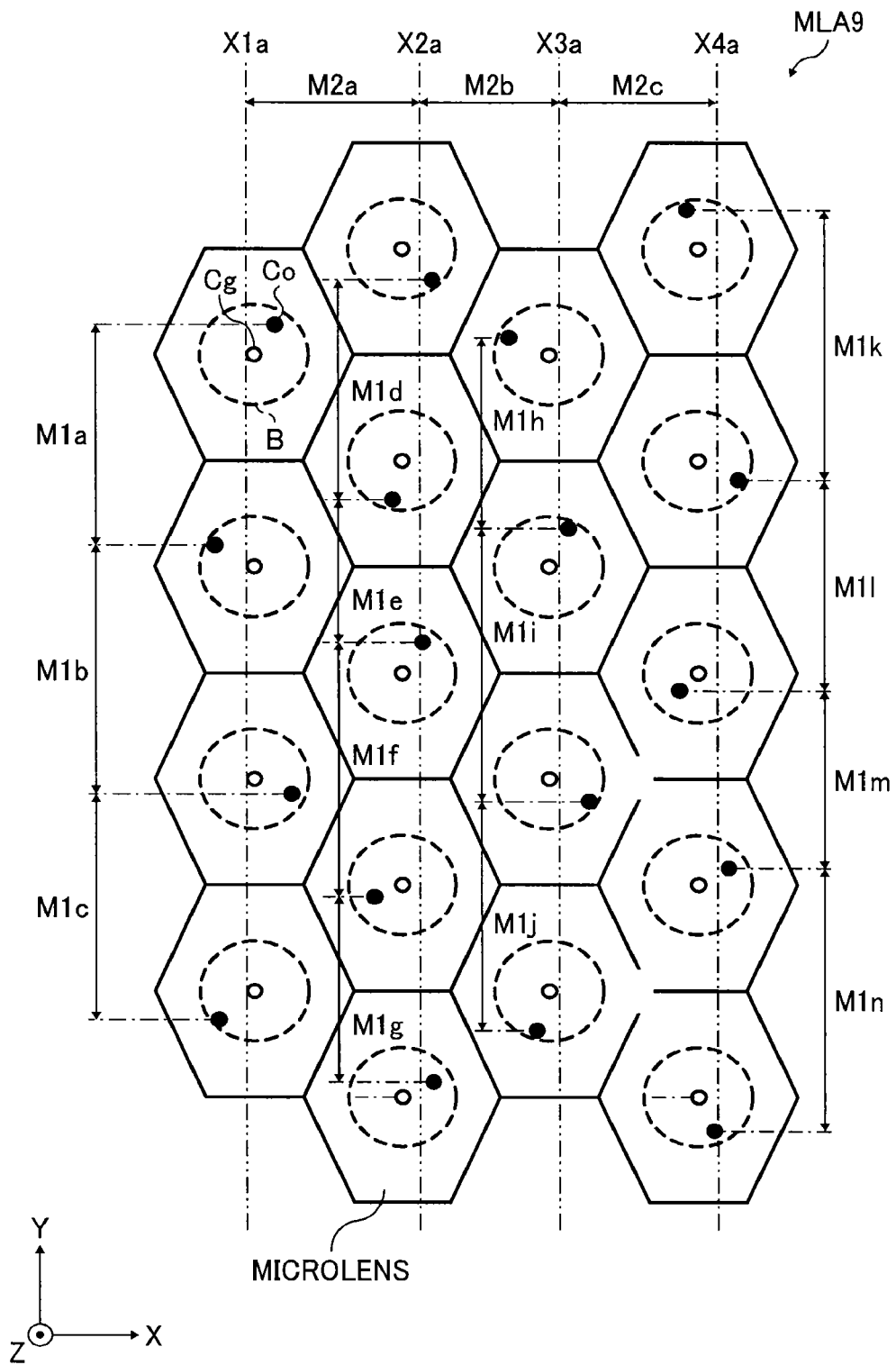
FIG. 26 is a diagram for explaining a micro-lens array (MLA9) of Example 9.

In an MLA9 of Example 9, as illustrated in FIG. 26, similarly to Example 8, a plurality of micro-lenses which have a vertically-elongated hexagon shape and are substantially the same are arranged in an armchair shape without gap, and optical center of each micro-lens is randomly located to be eccentric.

In the MLA9, when an average value of Y-directional distances between optical centers of two micro-lenses adjacent to each other in the Y direction is denoted by M1 and an average value of adjacent intervals between adjacent axes passing through X-directional average positions of optical centers of the plurality of micro-lenses of each lens column and extending in the Y direction is denoted by M2, and X-directional and Y-directional magnification ratios of an observation optical system are denoted by B1 and B2, respectively, in a case where M1>M2 and B1<B2 or M1<M2 and B1>B2 is satisfied, it is possible to suppress degradation in image quality, and in a case where M1×B1≈M2×B2 is satisfied, it is possible to further suppress degradation in image quality. More specifically, in Example 9, in case of using a vertically-elongated micro-lens, it is obtained that M2<M1. Therefore, in a case where B2>B1 is satisfied, it is possible to suppress degradation in image quality. On the other hand, contrary to Example 7, in case of using a horizontally-elongated micro-lens, it is obtained that M1<M2. Therefore, in a case where B2<B1 is satisfied, it is possible to suppress degradation in image quality. In addition, when X coordinates of optical centers of the plurality of micro-lenses of each lens column are denoted by x1, x2, . . . , xN, an X-directional average position of the optical center of the lens column is (x1+x2+ . . . +xN)/N.

Hereinafter, M1 and M2 will be described in detail.

X-directional distances of the optical centers of adjacent two micro-lenses among a plurality (for example, four) of micro-lenses of the first lens column are M1a, M1b, and M1c.

X-directional distances of the optical centers of adjacent two micro-lenses among a plurality (for example, five) of micro-lenses of the second lens column are M1d, M1e, M1f, and M1g.

X-directional distances of the optical centers of adjacent two micro-lenses among a plurality (for example, four) of micro-lenses of the third lens column are M1h, M1i, and M1j.

X-directional distances of the optical centers of adjacent two micro-lenses among a plurality (for example, five) of micro-lenses of the fourth lens column are M1k, M1l, M1m, and M1n.

Therefore, it is obtained that M1=(M1a+M1b+M1c+M1d+M1e+M1f+M1g+M1h+M1i+M1j+M1k+M1l+M1m+M1n)/14.

When the axes passing through the Y-directional average position of the optical centers of a plurality (for example, four or five) of micro-lenses of the first to fourth lens column are denoted by X1a, X2a, X3a, and X4a, the interval between X1a and X2a is denoted by M2a, the interval between X2a and X3a is denoted by M2b, and the interval between X3a and X4a is denoted by M2c, M2=(M2a+M2b+M2c)/3 is obtained.

In the MLA1 to MLA9 of Examples 1 to 9 described heretofore, although the boundary directions are regular, even in the random-arranged lens array where the boundary directions are randomly dispersed, the similar argument is established.

According to a first aspect, an HUD according to the embodiment described heretofore includes a light source unit 100, a two-dimensional deflector 6 (image forming element) for forming an image by light from the light source unit 100, a micro-lens array (MLA, MLA1 to MLA9) which is irradiated with the light which is to form the image; and a concave mirror 9 (projection optical system) which projects light passing through the micro-lens array toward a reflecting plane member 10 (transmitting and reflecting member), the micro-lens array includes a lens column group configured with a plurality of lens columns, each of which is configured with a plurality of micro-lenses arranged in a first direction, which are arranged in a second direction perpendicular to the first direction, and with respect to an average value M1 of first-directional distances between optical centers of the two micro-lenses adjacent to each other in the first direction in the lens column group, an average value M2 of adjacent intervals between adjacent axes passing through a second-directional average position of the optical centers of the plurality of micro-lenses of each lens column in the lens column group and extending in the first direction, a first-directional magnification ratio B1 of an observation optical system including the concave mirror 9 and the reflecting plane member 10, and a second-directional magnification ratio B2 of the observation optical system, B1<B2 and M1>M2 or B1>B2 and M1<M2 is satisfied. In addition, in a case where the number of lens columns is two, that is, a case where the adjacent interval between the adjacent axes is one, it is preferable that the adjacent interval is set as the average value M2.

In this case, it is possible to reduce a difference between the first-directional and second-directional pixel pitches of the display image (virtual image visually noticeable through the reflecting plane member 10).

As a result, it is possible to achieve miniaturization while suppressing degradation in image quality.

In addition, in a case where M1×B1≈M2×B2 is satisfied, since the first-directional and second-directional pixel pitches of the display image are substantially equal to each other, it is possible to further suppress degradation in image quality.

In addition, according to a second aspect, an HUD according to the embodiment includes a light source unit 100, a two-dimensional deflector 6 (image forming element) for forming an image by light from the light source unit 100, a micro-lens array which is irradiated with the light which is to form the image, and a concave mirror 9 (projection optical system) which projects light passing through the micro-lens array toward a reflecting plane member 10 (transmitting and reflecting member), and the micro-lens array includes a lens column group configured with a plurality of lens columns, each of which is configured with a plurality of micro-lenses of which geometrical centers are aligned in a first direction at a pitch P1, which are aligned in a second direction perpendicular to the first direction at a pitch P2, with respect to the pitch P1, the pitch P2, a first-directional magnification ratio B1 of an observation optical system including the concave mirror 9 and the reflecting plane member 10, and a second-directional magnification ratio B2 of the observation optical system, B1<B2 and P1>P2 or B1>B2 and P1<P2 is satisfied.

In this case, it is possible to reduce a difference between the first-directional and second-directional pixel pitches of the display image (virtual image noticeable through the reflecting plane member 10).

As a result, it is possible to achieve miniaturization while suppressing degradation in image quality.

In addition, in a case where P1×B1≈P2×B2 is satisfied, since the first-directional and second-directional pixel pitches of the display image are substantially equal to each other, it is possible to further suppress degradation in image quality.

In addition, in a case where the optical center and the geometrical center of the micro-lens are substantially coincident with each other, it is possible to simplify design and manufacturing of the micro-lens array.

In addition, in the micro-lens array, in a case where the optical center of each micro-lens is randomly located to be eccentric from the geometrical center of the micro-lens and the first-directional and second-directional eccentricity ranges are substantially the same, it is possible to suppress occurrence of interference fringe in a display image (virtual image).

In addition, since the beam diameter of the beam incident on the micro-lens is smaller than the lens diameter of the micro-lens, it is possible to reduce interference such as speckle, and thus, it is possible to suppress degradation in image quality.

In addition, in a case where the lens boundary directions of the micro-lens array are randomly dispersed, it is possible to suppress occurrence of interference fringe in a display image (virtual image).

Therefore, in a mobile body apparatus including an HUD and a mobile body on which the HUD is mounted, it is possible to provide a mobile body apparatus capable of reducing an installation space for the HUD while suppressing degradation of visibility.

In addition, in the HUD, the shape of the virtual boundary area of the eccentricity range of the micro-lens is not limited to a circle shape, but it is preferable that at least X-directional and Y-directional eccentricity ranges are the same. For example, a square shape or the like having sides parallel to the X direction and the Y direction may be employed. In addition, the X-directional and Y-directional eccentricity ranges may not necessarily be the same. However, it is preferable that, between the X direction and the Y direction, the eccentricity range of the direction where the lens pitch is larger is equal to or larger than the eccentricity range of the direction where the lens pitch is smaller. In addition, the size of the eccentricity range may be appropriately changed.

In addition, in a case where the optical center of the micro-lens in the micro-lens array is located to be eccentric, the optical centers of all the micro-lenses are not necessarily located to be eccentric, but it is favorable that the optical center of at least one micro-lens is located to be eccentric.

In addition, with respect to the shape of the micro-lens in the micro-lens array, although the square or the rectangle among the quadrilateral shapes is exemplified, a parallelogram, a trapezoid, or the like other than the square or the rectangle may be employed.

In addition, in the above-described embodiment, although the two-dimensional deflector (optical scan type) is employed as the image forming element, the prevent invention is not limited thereto, but for example, a spatial light modulation type such as a transmission-type liquid crystal panel, a reflection-type liquid crystal panel, a DMD (digital micro-mirror device) panel may be employed.

In addition, in the above-described embodiment, although the micro-convex lens structure (micro-lens array) is used as the scanning-target surface element, the prevent invention is not limited thereto, but for example, a diffusion reflecting plate where micro-unevenness is formed on the surface, a transmitting screen of which surface is smooth, a reflecting screen of which surface is smooth, or the like may be used.

In addition, in the micro-lens array of the above-described embodiment, although the plurality of micro-lenses are two-dimensionally arranged, the plurality of micro-lenses may be one-dimensionally or three-dimensionally arranged.

In addition, in the above-described embodiment, although a two-dimensional image is formed on the micro-lens array by using the two-dimensional deflector, for example, one-dimensional image may be formed by using a one-dimensional deflector including a MEMS mirror, a galvano mirror, a polygon mirror, or the like.

In addition, in the above-described embodiment, although the projection optical system is configured with the concave mirror 9, the prevent invention is not limited thereto, but for example, the projection optical system may be configured with a convex mirror, or the projection optical system may be configured so as to include a curved-surface mirror (concave mirror or convex mirror) and a folding mirror disposed between the curved-surface mirror and the scanning-target surface element.

In addition, in the above-described embodiment, although the image forming unit includes the concave mirror 7, the image forming unit may not include the concave mirror. In this case, it is preferable that the concave mirror 9 is designed and arranged so as to correct the optical distortion component where a horizontal line of an intermediate image has an upward or downward convex shape due to the effect of the reflecting plane member 10.

In addition, in the above-described embodiment, although the image display device is configured so as to correspond to a color image, the image display device may be configured so as to correspond to a monochrome image.

In addition, the transmitting and reflecting member as the reflecting plane member 10 may be configured with a member, for example, a so-called combiner other than the windshield of the mobile body or may be configured in front of the windshield as viewed from the observer.

In addition, the transmitting and reflecting member is not limited to the windshield of the mobile body, but for example, a side glass, a rear glass, or the like may be employed. It is preferable that the transmitting and reflecting member is installed in the mobile body steered by a steersman visually noticing the virtual image or the transmitting and reflecting member is a windshield member (windshield) through which the steersman is to visually notice the outside of the mobile body.

In addition, the subject who can visually notice the virtual image by the image display device is not limited to the steersman of the mobile body, but for example, a navigator, a passenger, or other passengers riding on the mobile body may be available.

In addition, in the above-described embodiment, although the image display device (HUD) is described to be mounted on a mobile body such as a car, an airplane, and a ship as an example, the image display device may be mounted on an object. In addition, the "object" includes a permanently installed one or a transportable one in addition to the mobile body.

In addition, the image display device according to at least one embodiment of the present invention can be applied to a head-mount display which is mounted on the head of the observer as well as a head-up display.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

The invention claimed is:

1. An image display device, comprising:
a light source to emit light;
an image forming element to form an image with the light emitted from the light source;
a micro-lens array to be irradiated with the light forming the image, the micro-lens array including a plurality of lens columns arranged in a second direction, each lens column including a plurality of micro-lenses being arranged in a first direction, the first direction and the second direction being perpendicular with each other; and
a projection optical system to project light passing through the micro-lens array toward a transmitting and reflecting member, wherein
[(0<B1<B2) and (M1>M2>0)] or [(B1>B2>0) and (0<M1<M2)] is satisfied, in which
M1 denotes an average value of first-directional distances between optical centers of two micro-lenses adjacent to each other in the first direction in the micro-lens array,
M2 denotes an average value of adjacent intervals between adjacent axes, the adjacent axes each passing through a second-directional average position of optical centers of the plurality of micro-lenses of each lens column in the micro-lens array and extending in the first direction,
B1 denotes a first-directional magnification ratio of an optical system including the projection optical system and the transmitting and reflecting member,
B2 denotes a second-directional magnification ratio of the optical system, and
an optical center of a particular micro-lens in the micro-lens array is located away from a geometric center of the particular micro-lens.

2. The image display device according to claim 1, wherein M1×B1≈M2×B2 is satisfied.

3. The image display device according to claim 1, wherein the optical center of the particular micro-lens in the micro-lens array is randomly located to be eccentric from the geometrical center of the particular micro-lens, and first-directional and second-directional eccentricity ranges are substantially the same.

4. The image display device according to claim 1, wherein a beam diameter of light incident on the micro-lens array is smaller than a lens diameter of each micro-lens.

5. The image display device according to claim 1, wherein the micro-lenses in the micro-lens array are arranged in the first direction and the second direction in a matrix shape.

6. The image display device according to claim 5, wherein lens boundary directions of the micro-lens array are randomly dispersed.

7. The image display device according to claim 1, wherein each micro-lens in the micro-lens array has a hexagon shape, and the micro-lens array has a honeycomb shape.

8. The image display device according to claim 7, wherein the micro-lens array having the honeycomb shape is a zigzag-type array.

9. The image display device according to claim 7, wherein the micro-lens array having the honeycomb shape is an armchair-type array.

10. An object apparatus, comprising:
the image display device according to claim 1; and
an object on which the image display device is mounted.

11. The object apparatus according to claim 10, wherein the object is a mobile body, and the transmitting and reflecting member is a windshield of the mobile body.

12. An image display device, comprising:
a light source to emit light;
an image forming element to form an image with the light emitted from the light source;
a micro-lens array to be irradiated with the light forming the image, the micro-lens array including a plurality of lens columns arranged in a second direction at a pitch P2, each lens column including a plurality of micro-lenses having geometrical centers being aligned in a first direction at a pitch P1, the first direction and the second direction being perpendicular with each other; and
a projection optical system to project light passing through the micro-lens array toward a transmitting and reflecting member, wherein
[(0<B1<B2) and (P1>P2>0)] or [(B1>B2>0) and (0<P1<P2)] is satisfied, in which
B1 denotes a first-directional magnification ratio of an optical system including the projection optical system and the transmitting and reflecting member,
B2 denotes a second-directional magnification ratio of the optical system, and
a geometric center and an optical center of each micro-lens are substantially coincident with each other.

13. The image display device according to claim 12, wherein P1×B1≈P2×B2 is satisfied.

14. An image display device, comprising:
a light source to emit light;
an image forming element to form an image with the light emitted from the light source;
a micro-lens array to be irradiated with the light forming the image, the micro-lens array including a plurality of lens columns arranged in a second direction at a pitch P2, each lens column including a plurality of micro-lenses having geometrical centers being aligned in a first direction at a pitch P1, the first direction and the second direction being perpendicular with each other; and a projection optical system to project light passing through the micro-lens array toward a transmitting and reflecting member, wherein

[(0<B1<B2) and (P1>P2>0)] or [(B1>B2>0) and (0<P1<P2)] is satisfied, in which

B1 denotes a first-directional magnification ratio of an optical system including the projection optical system and the transmitting and reflecting member, B2 denotes a second-directional magnification ratio of the optical system, and P1×B1≈P2×B2 is satisfied.

* * * * *